(12) United States Patent
Miyawaki et al.

(10) Patent No.: US 9,569,897 B2
(45) Date of Patent: *Feb. 14, 2017

(54) HEAD MOUNTED DISPLAY AND OPTICAL POSITION ADJUSTMENT METHOD OF THE SAME

(71) Applicant: Sony Corporation, Tokyo (JP)

(72) Inventors: Tetsuyuki Miyawaki, Kanagawa (JP); Ikuo Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,700

(22) Filed: Jun. 8, 2015

(65) Prior Publication Data

US 2015/0269784 A1 Sep. 24, 2015

Related U.S. Application Data

(63) Continuation of application No. 14/458,354, filed on Aug. 13, 2014, now Pat. No. 9,201,242, which is a (Continued)

(30) Foreign Application Priority Data

Apr. 8, 2010 (JP) ................................ 2010-089494

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G02B 27/0172* (2013.01); *G06F 3/012* (2013.01);
(Continued)

(58) Field of Classification Search
CPC ............. G02B 27/017; G02B 27/0172; G02B 2027/0134; G02B 2027/0161; H04N 13/044; H04N 13/0497; G06F 3/012; G06F 3/1423; G09G 2356/00; G09G 3/003
See application file for complete search history.

(56) References Cited

U.S. PATENT DOCUMENTS 5,151,722 A * 9/1992 Massof et al. ................ 351/158
5,451,976 A * 9/1995 Ito ..................................... 345/8
(Continued)

FOREIGN PATENT DOCUMENTS

CN 1652575 A 8/2005
CN 1707308 A 12/2005
(Continued)

OTHER PUBLICATIONS

Janin et al., Calibration of head-mounted displays for augmented reality applications, Virtual Reality Ann. Intl. Symp., 1993:246-255.

*Primary Examiner* — Abbas Abdulselam
(74) *Attorney, Agent, or Firm* — Wolf, Greenfield & Sacks, P.C.

(57) ABSTRACT

Disclosed herein is an optical position adjustment method of a head mounted display, the head mounted display including (a) an eyeglass type frame worn on the head of a viewer, and (b) two image display devices for the right and left eyes attached to the frame, and each of the image display devices including (A) an image forming device, and (B) an optical device adapted to receive, guide and emit light emitted from the image forming device, wherein the optical position adjustment method includes the step of: controlling an image signal that is supplied to the image forming device making up at least one of the image display devices so as to control the position of the image displayed on the optical (Continued)

device making up at least one of the image display devices and adjust the mutual positions of the two images.

26 Claims, 21 Drawing Sheets

Related U.S. Application Data continuation of application No. 13/078,147, filed on Apr. 1, 2011, now Pat. No. 8,907,865.

(51) Int. Cl.
*H04N 13/04* (2006.01)
*G06F 3/01* (2006.01)
*G06F 3/14* (2006.01)
*G09G 3/00* (2006.01)

(52) U.S. Cl.
CPC ............ *G09G 3/003* (2013.01); *H04N 13/044* (2013.01); *H04N 13/0497* (2013.01); *G02B 2027/014* (2013.01); *G02B 2027/0134* (2013.01); *G02B 2027/0138* (2013.01); *G02B 2027/0161* (2013.01); *G02B 2027/0178* (2013.01); *G06F 3/1423* (2013.01); *G09G 3/002* (2013.01); *G09G 2340/0464* (2013.01); *G09G 2354/00* (2013.01); *G09G 2356/00* (2013.01)

(56) References Cited

U.S. PATENT DOCUMENTS

| | | | |
|---|---|---|---|
| 5,579,026 A | | 11/1996 | Tabata |
| 5,781,165 A | | 7/1998 | Tabata |
| 5,825,456 A | | 10/1998 | Tabata et al. |
| 6,163,336 A | * | 12/2000 | Richards ........................ 348/42 |
| 6,177,966 B1 | * | 1/2001 | Masuda et al. ................... 349/8 |
| 6,490,086 B2 | * | 12/2002 | Morishima ............ G03B 21/56 359/443 |
| 6,538,624 B1 | | 3/2003 | Karasawa et al. |
| 7,199,934 B2 | | 4/2007 | Yamasaki |
| 7,576,916 B2 | | 8/2009 | Amitai |
| 7,710,654 B2 | | 5/2010 | Ashkenazi et al. |
| 8,388,138 B1 | * | 3/2013 | Boothroyd ........................ 353/7 |
| 8,411,134 B2 | | 4/2013 | Tomita |
| 8,797,433 B2 | | 8/2014 | Kaizu et al. |
| 8,907,865 B2 | | 12/2014 | Miyawaki et al. |
| 8,976,453 B2 | | 3/2015 | Akutsu et al. |
| 8,988,315 B2 | | 3/2015 | Mukawa et al. |
| 9,164,221 B2 | | 10/2015 | Akutsu et al. |
| 9,201,242 B2 | | 12/2015 | Miyawaki et al. |
| 2005/0248852 A1 | | 11/2005 | Yamasaki |
| 2007/0070504 A1 | | 3/2007 | Akutsu et al. |
| 2007/0070859 A1 | | 3/2007 | Hirayama |
| 2008/0136916 A1 | * | 6/2008 | Wolff ............................ 348/169 |
| 2010/0128107 A1 | | 5/2010 | Tomita |
| 2011/0241975 A1 | | 10/2011 | Mukawa et al. |
| 2011/0248904 A1 | | 10/2011 | Miyawaki et al. |
| 2012/0218426 A1 | | 8/2012 | Kaizu et al. |
| 2013/0128611 A1 | | 5/2013 | Akutsu et al. |
| 2013/0135749 A1 | | 5/2013 | Akutsu et al. |
| 2014/0340550 A1 | | 11/2014 | Kaizu et al. |
| 2014/0347252 A1 | | 11/2014 | Miyawaki et al. |
| 2015/0109679 A1 | | 4/2015 | Mukawa et al. |
| 2015/0138647 A1 | | 5/2015 | Akutsu et al. |
| 2015/0235620 A1 | | 8/2015 | Takahota et al. |
| 2015/0346494 A1 | | 12/2015 | Tanaka et al. |
| 2015/0362735 A1 | | 12/2015 | Akutsu et al. |
| 2015/0370075 A1 | | 12/2015 | Ato et al. |
| 2016/0041394 A1 | | 2/2016 | Tanaka et al. |
| 2016/0062123 A1 | | 3/2016 | Tanaka et al. |
| 2016/0097931 A1 | | 4/2016 | Takahota et al. |
| 2016/0147069 A1 | | 5/2016 | Tanaka et al. |

FOREIGN PATENT DOCUMENTS

| | | |
|---|---|---|
| EP | 1564585 A1 | 8/2005 |
| JP | 07-250293 A | 9/1995 |
| JP | 08-211332 | 8/1996 |
| JP | 08-322004 | 12/1996 |
| JP | 09-322197 | 12/1997 |
| JP | 10-262165 A | 9/1998 |
| JP | 11-252523 A | 9/1999 |
| JP | 2000-171751 A | 6/2000 |
| JP | 2001-344617 A | 12/2001 |
| JP | 2003-334221 A | 11/2003 |
| JP | 2004-280127 A | 10/2004 |
| JP | 2005-284007 A | 10/2005 |
| JP | 2005-311754 A | 11/2005 |
| JP | 2006-033011 A | 2/2006 |
| JP | 2006-162767 A | 6/2006 |
| JP | 2007-094175 A | 4/2007 |
| JP | 2007-116538 A | 5/2007 |
| JP | 2008-083290 A | 4/2008 |
| JP | 2008-123257 A | 5/2008 |
| JP | 2010-011055 A | 1/2010 |
| JP | 2010-139589 A | 6/2010 |

* cited by examiner

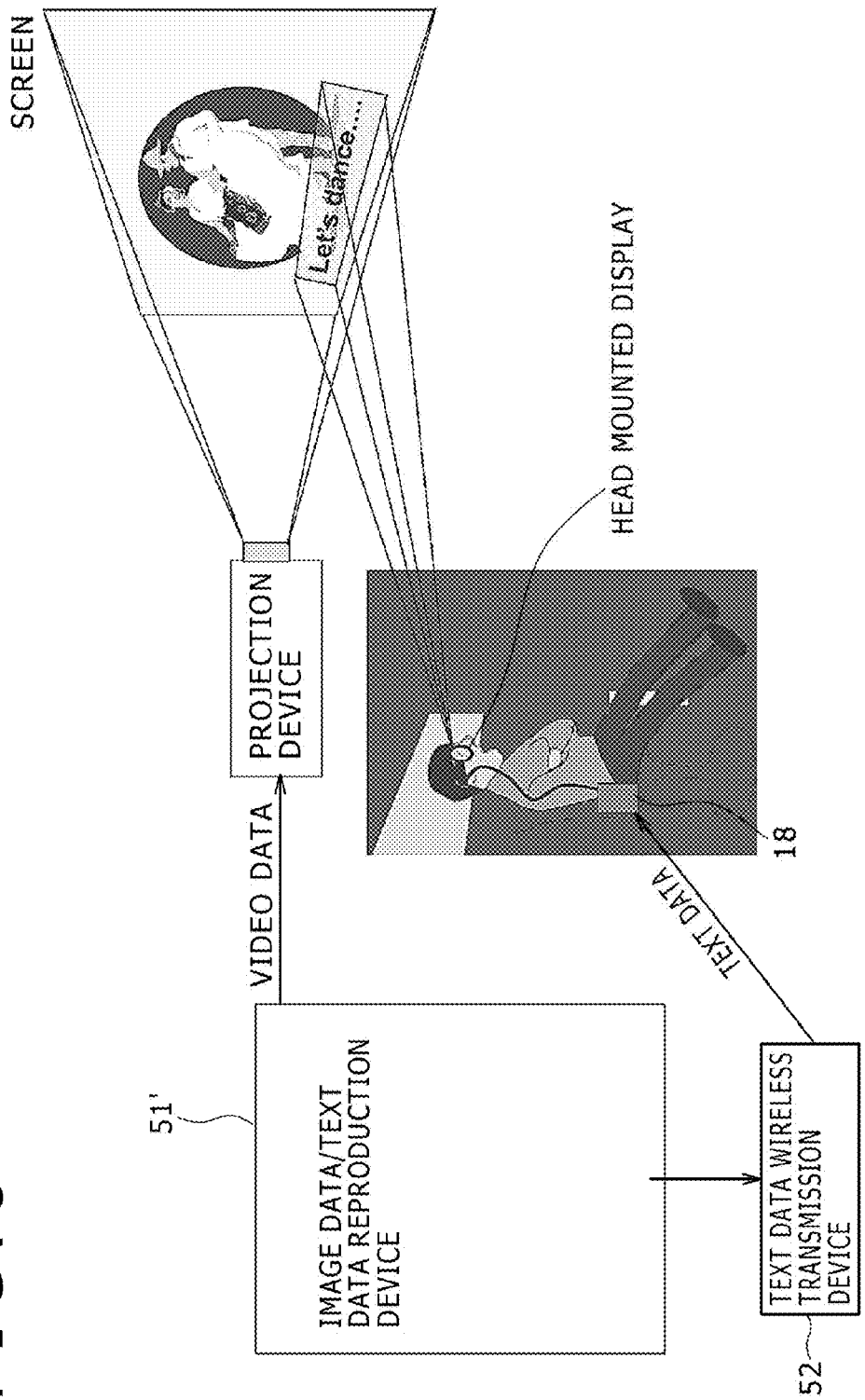

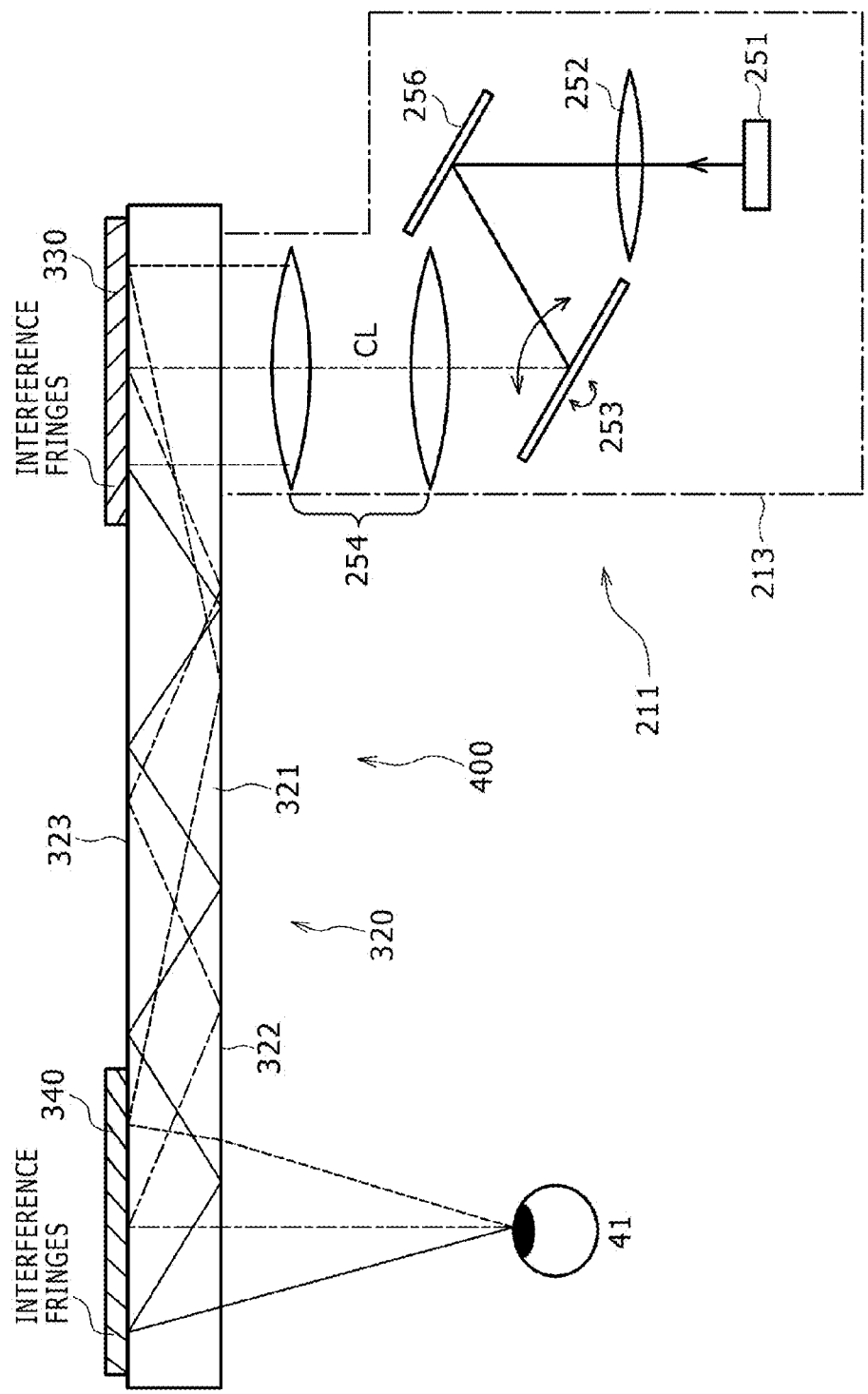

HEAD MOUNTED DISPLAY AND OPTICAL POSITION ADJUSTMENT METHOD OF THE SAME

CROSS REFERENCE TO RELATED APPLICATIONS

This application is a continuation of U.S. patent application Ser. No. 14/458,354, entitled "HEAD MOUNTED DISPLAY AND OPTICAL POSITION ADJUSTMENT METHOD OF THE SAME," filed Aug. 13, 2014, which is a continuation of U.S. patent application Ser. No. 13/078,147, now U.S. Pat. No. 8,907,865, entitled "HEAD MOUNTED DISPLAY AND OPTICAL POSITION ADJUSTMENT METHOD OF THE SAME," filed on Apr. 1, 2011, which claims the benefit under 35 U.S.C. §119 of the filing date of Japanese Patent Application JP 2010-089494, filed on Apr. 8, 2010. Each of the foregoing documents is incorporated herein by reference in its entirety.

BACKGROUND OF THE INVENTION

1. Field of the Invention

The present invention relates to a head mounted display (HMD) and an optical position adjustment method of the head mounted display.

2. Description of the Related Art

A virtual image display device (image display device) is well known, for example, from Japanese Patent Laid-Open No. 2006-162767 that is designed to allow for the viewer to view a two-dimensional image, formed by an image forming device, as an enlarged virtual image by means of a virtual image optics.

As illustrated in a conceptual diagram shown in FIG. 1, an image display device 100 includes an image forming device 111, collimating optics 112 and optical device (light guiding section) 120. The image forming device 111 includes a plurality of pixels arranged in a two-dimensional matrix. The collimating optics 112 shapes light, emitted from the pixels of the image forming device 111, into parallel beams. The optical device 120 receives light shaped into parallel beams by the collimating optics 112, guides the beams therein and emits them. The optical device 120 includes a light guide plate 121, first deflection section 130 (e.g., made up of a single layer of an optical reflecting film) and second deflection section 140 (e.g., made up of a multi-layer optical reflecting film having a multi-layer stacked structure). The light guide plate 121 emits incident light that has propagated therein by total reflection. The first deflection section 130 reflects incident light on the light guide plate 121 in such a manner that incident light is totally reflected in the light guide plate 121. The second deflection section 140 causes light, that has propagated in the light guide plate 121 by total reflection, to be emitted from the light guide plate 121. When used to make up an HMD, the image display device 100 configured as described above contributes to reduced weight and size of the HMD.

Alternatively, a virtual image display device (image display device) using a holographic diffraction grating is well known, for example, from Japanese Patent Laid-Open No. 2007-94175 that is designed to allow for the viewer to view a two-dimensional image, formed by an image forming device, as an enlarged virtual image by means of a virtual image optics.

As illustrated in a conceptual diagram shown in FIGS. 12A and 12B, an image display device 300 basically includes the image forming device 111 and collimating optics 112 and an optical device (light guiding section) 320 adapted to receive light displayed on the image forming device 111 for displaying an image and guide it onto an eye 41 of the viewer. Here, the optical device 320 includes a light guide plate 321 and first and second diffraction grating members 330 and 340 each made up of a reflection volume holographic diffraction grating provided on the light guide plate 321. The collimating optics 112 receives light emitted from the pixels of the image forming device 111 and shapes it into parallel beams which are then received by the light guide plate 321. The parallel beams strike a first surface 322 of the light guide plate 321 and are emitted therefrom. On the other hand, the first and second diffraction grating members 330 and 340 are attached to a second surface 323 of the light guide plate 321 that is parallel to the first surface 322 thereof.

Still alternatively, a stereoscopic display is well known from Japanese Patent Laid-Open Nos. Hei 08-322004 and Hei 08-211332 that is designed to display, on the display surface of the display section, an image in such a manner as to permit stereoscopic viewing. The stereoscopic display device disclosed in Japanese Patent Laid-Open No. Hei 08-322004 includes a section adapted to electrically move the image displayed on the display device horizontally so that the convergence angle roughly matches the visibility in real time. On the other hand, the stereoscopic image reproduction device disclosed in Japanese Patent Laid-Open No. Hei 08-211332 is designed to provide a stereoscopic image by taking advantage of binocular parallax and includes a convergence angle selection section and control section. The convergence angle selection section sets the convergence angle for viewing a reproduced image. The control section controls the relative reproduction positions of the left and right images based on the information about the selected convergence angle.

SUMMARY OF THE INVENTION

Incidentally, if the viewer frequently puts on and takes off a frame 1010 in a repeated fashion as illustrated in FIGS. 21A and 21B, temple portions 1013, for example, may expand in the direction shown by an arrow A. This causes a front portion 1011 of the frame 1010 to deform in the direction shown by an arrow B. In the event of such a phenomenon, the spatial position of the image (virtual image) (virtual image position) formed by light emitted from the optical device 120 or 320 changes.

In the case of a binocular head mounted display in particular, such a phenomenon changes the convergence angles of the left and right images. This leads to discrepancy in preadjusted spatial distance to the virtual image, causing fatigue to the viewer during viewing. That is, in FIG. 21B, where the spatial position where the preadjusted centers of the left and right virtual image screens intersect each other is "C," the spatial position where the centers of the left and right virtual image screens intersect each other moves to "D" as a result of the deformation of the front portion 1011 of the frame 1010, thus resulting in a larger convergence angle. It should be noted that such a change in convergence angle may also occur due, for example, to impact on the binocular head mounted display or change over time.

On the other hand, the optical adjustment of the two image display devices 100 or 300 for the right and left eyes is necessary during manufacture of a binocular head mounted display. That is, the relative position adjustment of the two image display devices 100 or 300 is required so as to provide a desired image. However, such an adjustment is often difficult to achieve.

Japanese Patent Laid-Open Nos. Hei 08-322004 and Hei 08-211332 do not disclose any specific method to adjust the relative positions of the two image display devices 100 or 300 in such a binocular head mounted display in the event of a change in the relative positions thereof due to a variety of causes or during assembly of a binocular head mounted display.

In light of the foregoing, it is desirable to provide a method to adjust, with ease, the relative positions of two images displayed on two image display devices in a binocular head mounted display in the event of a change in the relative positions of the two image display devices due to a variety of causes or during assembly of a binocular head mounted display and the head mounted display.

Optical position adjustment methods of a head mounted display according to first to fourth embodiments are intended for use in a head mounted display (binocular head mounted display) including:

(a) an eyeglass type frame worn on the head of the viewer, and (b) two image display devices for the right and left eyes attached to the frame, in which each of the image display devices includes:

(A) an image forming device, and (B) an optical device adapted to receive, guide and emit light emitted from the image forming device.

In the optical position adjustment method of a head mounted display according to the first embodiment (hereinafter may be referred to as the method of the present invention according to the first embodiment), an image signal (input image signal or input image data) is controlled that is supplied to the image forming device making up at least one of the image display devices, thus controlling the position of the image displayed on the optical device making up at least one of the image display devices and thereby adjusting the mutual positions of the two images.

In the optical position adjustment method of a head mounted display according to the second embodiment (hereinafter may be referred to as the method of the present invention according to the second embodiment), firstly, an image displayed on each optical device is captured with an associated imaging device. Secondly, the displacement of the image obtained by each of the imaging devices from a reference position is found. Thirdly, an image signal (input image signal or input image data) is controlled that is supplied to the image forming device making up at least one of the image display devices so as to eliminate the displacement, thus adjusting the mutual positions of the two images.

Further, in the optical position adjustment method of a head mounted display according to the third embodiment (hereinafter may be referred to as the method of the present invention according to the third embodiment), an image signal (input image signal or input image data) is controlled that is supplied to the image forming device making up at least one of the image display devices, thus controlling the position of the image displayed on the optical device making up at least one of the image display devices and thereby adjusting the mutual positions of the two images. Additionally, based on the distance from the head mounted display to the target, an image signal (input image signal or input image data) is further controlled that is supplied to the image forming device making up at least one of the image display devices, thus adjusting the convergence angle commensurate with the distance from the head mounted display to the target.

Still further, in the optical position adjustment method of a head mounted display according to the fourth embodiment (hereinafter may be referred to as the method of the present invention according to the fourth embodiment), first, an image displayed on each optical device is captured with an associated imaging device. Next, the displacement of the image obtained by each of the imaging devices from a reference position is found. Then, an image signal (input image signal or input image data) is controlled that is supplied to the image forming device making up at least one of the image display devices so as to eliminate the displacement, thus adjusting the mutual positions of the two images. Additionally, based on the distance from the head mounted display to the target, an image signal (input image signal or input image data) is further controlled that is supplied to the image forming device making up at least one of the image display devices, thus adjusting the convergence angle commensurate with the distance from the head mounted display to the target.

It should be noted that, in the method of the present invention according to the first or third embodiment, an image signal (input image signal or input image data) supplied to the image forming device to adjust the mutual positions of the two images will be referred to as a "first image signal" for convenience. Further, an image displayed on each optical device is captured with an associated imaging device in the method of the present invention according to the second or fourth embodiment. An image signal supplied at this time to the image forming device to obtain an image is also a "first image signal." Still further, in the method of the present invention according to the third or fourth embodiment, an image signal (input image signal or input image data) supplied to the image forming device making up at least one of the image display devices and controlled based on the distance from the head mounted display to the target will be referred to as a "second image signal" for convenience. In the method of the present invention according to the third or fourth embodiment, the image display device controlled by the first image signal and that controlled by the second signal may be the same or different image display devices. Still further, in the methods of the present invention according to the first to fourth embodiments, the image display devices controlled by the first image signal may be two image display devices, and the image display devices controlled by the second image signal may be two image display devices.

In the methods of the present invention according to the first to fourth embodiments, the first image signal is controlled that is supplied to the image forming device making up at least one of the image display devices, thus controlling the position of the image displayed on the optical device making up at least one of the image display devices and thereby adjusting the mutual positions of the two images. This makes it possible to optically adjust the two image display devices for the right and left eyes, that is, adjust the optical positions of the two image display devices with ease to provide a desired image, for example, during manufacture of a binocular head mounted display. Further, the mutual optical positions of the two image display devices can be adjusted without using any special parts or mechanical adjustment, thus contributing to reduced number of manufacturing steps for the head mounted display and reduced manufacturing cost. Moreover, it is possible to readily respond to the change in mutual optical positions of the two image display devices over time, contributing to significantly reduced adjustment cost and adjustment time. That is, it is possible to electrically accommodate an assembly error of the head mounted display and the change in mutual optical positions of the two image display devices over time, thus providing the advantageous effects described above. Further, it is possible to instantly change the distance to the virtual image formed by the two optical devices according to the location and situation of use. Still further, the viewer can actively or passively change the distance to the virtual image, thus allowing for the viewer to view the virtual image at a comfortable position. Further, the head mounted display includes the image display devices, thus contributing to reduced weight and size of the head mounted display and providing significantly reduced discomfort while the head mounted display is worn.

BRIEF DESCRIPTION OF THE DRAWINGS

FIG. 8 is a conceptual diagram of the head mounted display in example 1 while being used;

FIG. 13 is a conceptual diagram of the image display device of the head mounted display in example 4;

DETAILED DESCRIPTION OF THE PREFERRED EMBODIMENTS

Figure 1:
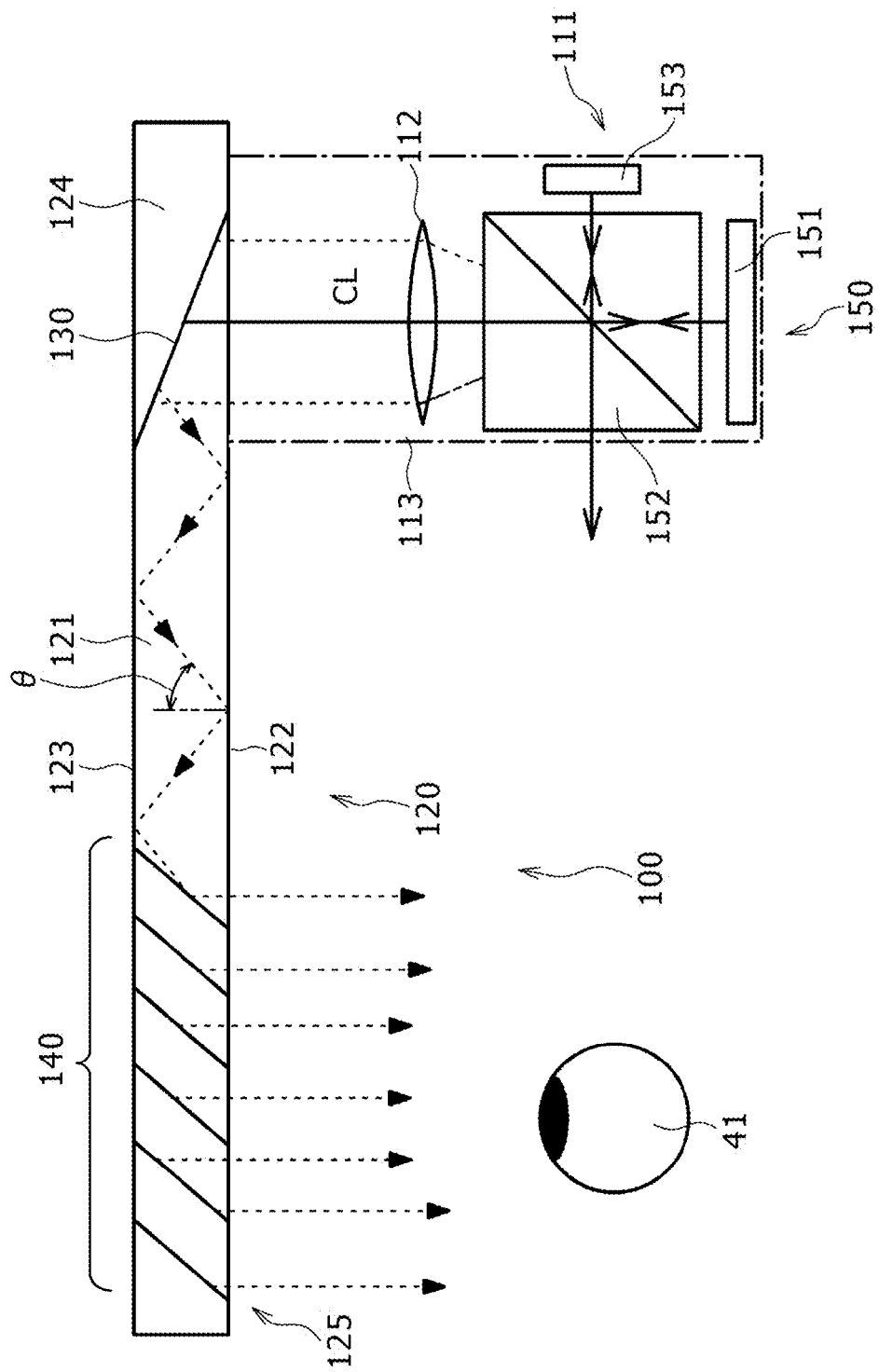
FIG. 1 is a conceptual diagram of an image display device of a head mounted display in example 1.

Although a detailed description will be given below with reference to the accompanying drawings and based on the preferred embodiments, the present invention is not limited to these preferred embodiments. Various numbers and materials given in the embodiments are merely illustrative. It should be noted that the description will be given in the following order:
1. Description in general of the optical position adjustment method of the head mounted displays according to the first to fourth embodiments
2. Example 1 (optical position adjustment method of the head mounted displays according to the first and third embodiments)
3. Example 2 (modification of example 1)
4. Example 3 (another modification of example 1)
5. Example 4 (modification of example 3)
6. Example 5 (modification of examples 1 to 4)
7. Example 6 (modification of example 5)
8. Example 7 (still another modification of example 1)
9. Example 8 (optical position adjustment method of the head mounted displays according to the second and fourth embodiments)
10. Example 9 (modification of example 8) and others In the method of the present invention according to the second or fourth embodiment, a reference position can be an imaging position of a subject in an imaging device obtained when the subject, located at a given position forward of two optical devices, is imaged by the imaging device.

In the methods of the present invention according to the first to fourth embodiments including the above preferred modes, the adjustment of the mutual positions of the two images can be accomplished by an arbitrary combination of horizontal and vertical movements and rotation of the image displayed on the optical device making up at least one of the image display devices. In order to move the image in the manners described above, it is only necessary to, for example, set aside a non-display portion on the optical device and assign this portion for moving the image.

In the methods of the present invention according to the first to fourth embodiments including the above preferred modes, it is preferred that the optical devices should be see-through. More specifically, at least the portions of the optical devices for the both eyes of the viewer should preferably be see-through so that the viewer can see the outside scenery through these portions of the optical devices.

In the method of the present invention according to the third or fourth embodiment including the above-described preferred modes, distance information from the head mounted display to the target can be transmitted to the head mounted display from external equipment in addition to the image signal (second image signal) supplied to the image forming device. It should be noted that the distance information need only be transmitted wirelessly to the head mounted display from external equipment. Alternatively, the head mounted display can further include a distance measurement device adapted to measure the distance to the target from the head mounted display so that the distance information can be obtained by the distance measurement device. More specifically, among examples of the distance measurement device are a camera or imaging device with auto-focusing capability (e.g., active distance measurement device adapted to irradiate infrared radiation or ultrasound onto the target and detect the distance according to the time it takes for the reflected radiation to return or the irradiation angle, or a camera or imaging device with a passive distance measurement device) and a distance measurement device for camera with auto-focusing capability (active distance measurement device). Alternatively, buttons or switches can be provided on the control device to manually set the distance to the target from the head mounted display.

Further, in the method of the present invention according to the third or fourth embodiment including the above-described preferred modes and configuration, a luminance signal of an image to be displayed on the optical devices can be transmitted to the head mounted display from external equipment in addition to the image signal (second image signal) supplied to the image forming devices. It should be noted that the luminance signal need only be transmitted wirelessly to the head mounted display from external equipment. Alternatively, the head mounted display can further include a light reception sensor so that the luminance of the image to be displayed on the optical devices can be controlled based on luminance information of the environment (atmosphere in which the head mounted display or target is located) obtained by the light reception sensor. More specifically, among examples of the light reception sensor are a photodiode and a light reception element for exposure measurement incorporated in the above camera or imaging device.

Still further, in the method of the present invention according to the third or fourth embodiment including the above-described preferred modes and configurations, the image signal (second image signal) is further controlled that is supplied to the image forming device making up at least one of the image display devices based on distance from the head mounted display to the target. At this time, the image displayed on the optical devices by the second image signal can be made up of text. The second image signal used to display text as an image (may be referred to as "text data") is digital data and need only be prepared in advance by a worker or processing, for example, by a computer. The text data format depends on the head mounted display or system used and need only be selected as appropriate.

Still further, in the method of the present invention according to the third or fourth embodiment including the above-described preferred modes and configurations, the position of a virtual image formed by the two optical devices (virtual image position) or the distance to the virtual image formed by the two optical devices from the two optical devices (virtual image distance) can be changed over time. Here, the term "changing over time" refers to changing, every five to ten minutes, the horizontal position of the image by two pixels in the positive direction or one pixel in the negative direction on the image forming device, for example, for a period of one to three minutes and then restoring the image to its original position.

In the method of the present invention according to the third or fourth embodiment, the convergence angle is adjusted commensurate with the distance from the head mounted display to the target. This brings the distance between the target and viewer (audience) into agreement, or as close agreement as possible, with the virtual image distance of the image displayed by the image display devices, thus allowing for the viewer (audience) watching the target to naturally watch (view) the image displayed by the image display devices without significantly changing the focus. In other words, it can be said that so long as such a condition is achieved, the distance between the target and viewer (audience) is equal to the virtual image distance of the image displayed by the image display devices.

In the present invention, an image signal (input image signal or input image data) that allows for a kind of test pattern to be displayed is among examples of the first image signal. More specifically, a horizontally extending line, vertically extending line and diagonally extending line are some of the examples. Here, the term "controlling the first image signal" refers to adding a display position correction signal to the first image signal. The display position correction signal is added to the first image signal so that the image displayed by the image display device for the left eye and that displayed by the image display device for the right eye are superimposed one on top of another, for example, at an infinitely distant place (or desired position). In the method of the present invention according to the first or third embodiment, for example, the display position correction signal is added to the first image signal so that the image displayed by the image display device for the left eye and that displayed by the image display device for the right eye are superimposed one on top of another, for example, at an infinitely distant place (or desired position) with the worker wearing the head mounted display. Then, the display position correction signal added when the two images are superimposed one on top of another at an infinitely distant place (or desired position) need only be stored in the control device as a display position control signal. In the method of the present invention according to the second or fourth embodiment, on the other hand, it is only necessary to first capture the image displayed on each optical device with the associated imaging device, next find the displacement of the image position obtained by each of the imaging devices from the reference position, then find a display position correction signal adapted to eliminate the displacement. This display position correction signal need only be stored in the control device as a display position control signal. Then, the position of the image displayed on the optical device making up at least one of the image display devices is controlled, thus adjusting the mutual optical positions of the two image display devices. More specifically, it is only necessary to control the position of the image displayed on the optical device making up at least one of the image display devices so that the image displayed by the image display device for the left eye and that displayed by the image display device for the right eye are superimposed one on top of another, for example, at an infinitely distant place (or desired position). It should be noted that, in the methods of the present invention according to the first to fourth embodiments, the tasks described above need only be performed, for example, during assembly of the head mounted display, or alternatively at regular or irregular intervals. Then, the display position control signal obtained from the display position correction signal is stored in the control device (control circuit) and added to the second image signal by the control device. The control device can be configured using a well-known circuit.

In the method of the present invention according to the third or fourth embodiment, the second image signal is further controlled that is supplied to the image forming device making up at least one of the image display devices based on the distance from the head mounted display to the target. More specifically, such control need only be addition of a convergence angle control signal based on distance information and the display position control signal to the second image signal in the control device. This task need only be performed as appropriate, for example, during viewing of the target, and may be performed by the viewer. As described above, distance information from the head mounted display to the target may be transmitted to the head mounted display from external equipment. Alternatively, the distance information may be obtained by the distance measurement device. Still alternatively, buttons or switches may be provided on the control device to manually set the distance to the target from the head mounted display.

In the method of the present invention according to the third or fourth embodiment, the second image signal can be transmitted wirelessly to the head mounted display. The second image signal is received, for example, by the control device (control circuit) and processed thereby for image display.

In the image display devices making up the head mounted display (hereinafter simply referred to as the "image display devices of the present invention" for the methods of the present invention according to the first to fourth embodiments including the above-described preferred modes and configurations (hereinafter may be collectively simply referred to as the "method of the present invention"), each of the optical devices can include:
(a) a light guide plate adapted to emit incident light that has propagated therein by total reflection;
(b) a first deflection section adapted to deflect incident light on the light guide plate in such a manner that the incident light is totally reflected in the light guide plate; and
(c) a second deflection section adapted to deflect light, that has propagated in the light guide plate by total reflection, a plurality of times so as to cause the light, that has propagated therein by total reflection, to be emitted from the light guide plate. It should be noted that the term "total reflection" refers to internal total reflection or total reflection in the light guide plate. The same holds true for the description given below. On the other hand, the center of the first deflection section corresponds to the center of the optical device.

It should be noted that the point where a central beam that has emitted from the center of the image forming device and passed through the node of the optics on the side of the image forming device enters the optical device is the optical device center, the axis that passes through the optical device center and is parallel to the axial direction of the optical device is the X axis, and the axis that passes through the optical device center and matches the normal of the optical device is the Y axis. Here, the optics is provided between the imaging forming device and optical device to shape light, emitted from the image forming device, into parallel beams. The light flux shaped into parallel beams by the optics enters the optical device, is guided therein and then emitted.

In the image display device of the present invention, the central beam can intersect the XY plane at an angle ($\theta$) other than zero degree although not limited thereto. This contributes to reduced limitations as to the angle at which to attach the image display device to the attachment portion of an eyeglass frame, thus providing a high degree of design freedom. In this case, it is preferred, for example, from the viewpoint of ease in handling, setting up and attaching the image display device that the central beam should be included in the YZ plane. On the other hand, the optical axis of the optics can be included in the YZ plane and intersect the XY plane at an angle other than zero degree. Alternatively, the optical axis of the optics can be parallel to the YZ and XY planes and pass through a position off the center of the image forming device. Further, assuming that the XY plane matches the horizontal plane, the angle $\theta$ at which the central beam intersects the XY plane can be an elevation angle. That is, the central beam can proceed toward the XY plane from under the XY plane to strike the XY plane. In this case, it is preferred that the XY plane should intersect the vertical plane at an angle other than zero degree. Further, it is preferred that the XY plane should intersect the vertical plane at an angle $\theta'$. It should be noted that five degrees is among examples of the maximum value of $\theta'$ although the maximum value is not limited thereto. Here, the horizontal plane includes the line of sight ("horizontal line of sight of the viewer") when the viewer watches the target located in the horizontal direction (e.g., target at an infinitely distant place in the horizontal direction, skyline or horizon) and also includes the two eyes of the viewer on a horizontal level. On the other hand, the vertical plane is vertical to the horizontal plane. Alternatively, when the viewer watches the target located in the horizontal direction (e.g., target at an infinitely distant place in the horizontal direction, skyline or horizon), the central beam that is emitted from the optical device and enters the eyes of the viewer can form a depression angle. Any angle from five to 45 degrees is among examples of the depression angle with respect to the horizontal plane.

Here, the first deflection section can reflect incident light on the light guide plate, and the second deflection section can transmit or reflect light, that has propagated in the light guide plate by total reflection, a plurality of times. In this case, the first deflection section can serve as a reflecting mirror, and the second deflection section can serve as a half mirror.

In the configuration described above, the first deflection section can be made, for example, of a metal including an alloy and include a light reflecting film (kind of mirror) adapted to reflect incident light on the light guide plate or a diffraction grating (e.g., holographic diffraction grating film) adapted to diffract light incident on the light guide plate. Further, the second deflection section can include a multilayer stacked structure having a number of stacked dielectric films, half mirror, polarizing beam splitter or holographic diffraction grating film. Although the first and second deflection sections are provided inside the light guide plate (incorporated in the light guide plate), the first deflection section reflects or diffracts the parallel beam incident on the light guide plate so that the incident parallel beam is totally reflected in the light guide plate. On the other hand, the second deflection section reflects or diffracts, a plurality of times, the parallel beam that has propagated in the light guide plate by total reflection, after which the beam is emitted from the light guide plate still in the form of a parallel beam.

Alternatively, the first deflection section can diffract light incident on the light guide plate, and the second deflection section can diffract light, that has propagated in the light guide plate by total reflection, a plurality of times. In this case, the first and second deflection sections can each include a diffraction grating element. Further, the diffraction grating element can include a reflection or transmission diffraction grating element. Alternatively, one of the diffraction grating elements can be a reflection diffraction grating element, and the other diffraction grating element can be a transmission diffraction grating element. It should be noted that a reflection volume holographic diffraction grating is among examples of the reflection diffraction grating element. The first deflection section including a reflection volume holographic diffraction grating may be referred to as the "first diffraction grating member" for convenience, and the second deflection section including a reflection volume holographic diffraction grating may be referred to as the "second diffraction grating member" for convenience.

A single color (e.g., green) image can be displayed by the image display devices an embodiment of the present invention. When a color image is displayed, the first or second diffraction grating member can include a laminated structure of P diffraction grating layers made up of a reflection volume holographic diffraction grating for the diffraction and reflection of P different types of light having P different (e.g., P=3 or red, green and blue) wavelength ranges (or wavelengths). Interference fringes for one wavelength range (or wavelength) are formed on each diffraction grating layer. Alternatively, P different types of interference fringes can be formed on the first or second diffraction grating member composed of single-layered diffraction grating layer for the diffraction and reflection of P different types of light having P different wavelength ranges (or wavelengths). Still alternatively, the first or second diffraction grating member can include a laminated structure of diffraction grating layers, each associated with one of the angles of view obtained by dividing the angle of view, for example, into three equal parts. Adopting these configurations contributes to higher diffraction efficiency, larger diffraction acceptance angle and optimal diffraction angle during the diffraction and reflection of light having different wavelength ranges (or wavelengths) by the first or second diffraction grating member.

Among examples of the material of which the first or second diffraction grating member is made are photopolymer materials. The first and second diffraction grating members each including a reflection volume holographic diffraction grating need only be identical in material and basic structure to an existing reflection volume holographic diffraction grating. The term "reflection volume holographic diffraction grating" refers to a holographic diffraction grating adapted to diffract and reflect only positive first order diffracted light. Interference fringes are formed on the diffraction grating member from the inside to the surface thereof. Such interference fringes need only be formed in the same manner as in the existing method. More specifically, an object beam is irradiated onto the member (e.g., photopolymer material) making up the diffraction grating member from a first predetermined direction on one side. At the same time, a reference beam is irradiated onto the member making up the diffraction grating member from a second predetermined direction on the other side. It is only necessary to record the interference fringes formed by the object and reference beams in the member making up the diffraction grating member. Proper selection of the first and second predetermined directions and wavelengths of the object and reference beams provides a desired interference fringe pitch on the surface of the diffraction grating member and a desired slant angle of the interference fringes. The term "slant angle of the interference fringes" refers to the angle formed between the surface of the diffraction grating member (or diffraction grating layer) and the interference fringes. If the first and second diffraction grating members each include a laminated structure of P diffraction grating layers made up of a reflection volume holographic diffraction grating, such a lamination of diffraction grating layers need only be accomplished by first preparing P diffraction grating layers separately and then stacking (bonding) the diffraction grating layers one on top of another, for example, with an ultraviolet hardening adhesive. Alternatively, P diffraction grating layers may be prepared by first preparing one diffraction grating layer with an adhesive photopolymer material and then affixing adhesive photopolymer materials over the diffraction grating layer, sequentially one on top of another.

Alternatively, in the image display devices of the present invention, the optical devices can each include a half mirror adapted to receive light emitted from the image forming device and emit light toward the eye of the viewer. It should be noted that light emitted from the image forming device may propagate in the air and enter the half mirror. Alternatively, light may propagate in a transparent member such as glass plate or plastic plate (more specifically, member made of the same material as the light guide plate which will be described later) and enter the half mirror. It should be noted that the half mirror may be attached to the image forming device via the transparent member or via a member separate from the transparent member.

In the image display device of the present invention including the above-described preferred modes and configurations, the image forming device can include a plurality of pixels arranged in a two-dimensional matrix. It should be noted that the image forming device having such a configuration will be referred to as the "image forming device having a first configuration" for convenience.

Among examples of the image forming device having a first configuration are an image forming device including a reflection spatial light modulator and light source, that including a transmission spatial light modulator and light source and that including light-emitting elements such as organic EL (Electro Luminescence) elements, inorganic EL elements or light-emitting diodes (LEDs). Among others, an image forming device including a reflection spatial light modulator and light source is preferred. Among examples of the spatial light modulator are a light bulb, an LCOS (Liquid Crystal On Silicon) or other transmission or reflection liquid crystal display device and a digital micromirror device (DMD). A light-emitting element is an example of a light source. Further, the reflection spatial light modulator can include a liquid crystal display device and polarizing beam splitter. The polarizing beam splitter reflects part of light from the light source to guide it onto the liquid crystal display device and transmits part of light reflected by the liquid crystal display device to guide it onto the optics. Among examples of the light-emitting elements making up the light source are red, green, blue and white light-emitting elements. Alternatively, white light may be obtained by mixing red, green and blue light emitted from the red, green and blue light-emitting elements with light pipes and equalizing the luminance. Among examples of the light-emitting elements are a semiconductor laser element, solid-state laser and LED. The number of pixels need only be determined based on the specification required of the image display device. Among examples of the pixel count are 320 by 240, 432 by 240, 640 by 480, 1024 by 768 and 1920 by 1080.

Alternatively, in the image display device of the present invention including the above-described preferred modes and configurations, the image forming device can include a light source and a scanning section adapted to scan a parallel beam emitted from the light source. It should be noted that the image forming device having such a configuration will be referred to as the "image forming device having a second configuration" for convenience.

A light-emitting element is among examples of the light source in the image forming device having a second configuration. More specifically, red, green, blue and white light-emitting elements are among examples of the light-emitting element. Alternatively, white light may be obtained by mixing red, green and blue light emitted from the red, green and blue light-emitting elements with light pipes and equalizing the luminance. Among examples of the light-emitting element are a semiconductor laser element, solid-state laser and LED. The number of pixels (virtual pixels) in the image forming device having a second configuration need only be determined based on the specification required of the image display device. Among examples of the pixel count are 320 by 240, 432 by 240, 640 by 480, 1024 by 768 and 1920 by 1080. On the other hand, if a color image is displayed, and if the light source includes red, green and blue light-emitting elements, it is preferred that a cross prism should be used to combine the colors. Among examples of the scanning sections adapted to scan light emitted from the light source horizontally and vertically are a MEMS (Micro Electro Mechanical Systems) having a two-dimensionally rotatable micromirror, and a galvanomirror.

In the image forming device having a first or second configuration, light is shaped by the optics (optics adapted to shape emitted light into parallel beams that may be referred to as the "parallel beam emission optics" and, more specifically, a collimating optics or relay optics) into a plurality of parallel beams which then enter the light guide plate. The requirement that light must be parallel beams is based on the need for optical wavefront information at the time of incidence of these beams onto the light guide plate to be stored even after emission from the light guide plate via the first and second deflection sections. It should be noted that, more specifically, it is only necessary to provide, for example, an optical emission section of the image forming device, for example, at the focal distance position of the parallel beam emission optics in order to generate a plurality of parallel beams. The parallel beam emission optics is capable of converting pixel position information into angle information of an optics in an optical device. Among examples of the parallel beam emission optics are a convex lens, concave lens, free curved surface prism and hologram lens either alone or in combination with each other to form, as a whole, an optics having positive optical power. A light-shielding member having an opening may be provided between the parallel beam emission optics and light guide plate to prevent undesired light emitted from the parallel beam emission optics from entering the light guide plate.

The light guide plate has two parallel surfaces (first and second surfaces) that extend parallel to the axis of the light guide plate (X axis). If the surface on which light is incident is defined as an incidence surface of the light guide plate, and the surface from which light is emitted is defined as an emission surface of the light guide plate, both the incidence and emission surfaces of the light guide plate may be made up of the first surface. Alternatively, the incidence surface of the light guide plate may be made up of the first surface, and the emission surface of the light guide plate may be made up of the second surface. Among examples of the material of which the light guide plate is made are glasses including optical glass such as quartz glass and B7 and plastic materials (e.g., PMMA, polycarbonate resins, acryl-based resins, amorphous polypropylene-based resins and styrene-based resins including AS resin). The shape of the light guide plate is not limited to a flat plate. Instead, the light guiding plate may be curved in shape.

In the present invention, the frame can include a front portion and two temple portions. The front portion is provided at the front of the viewer. Each of the temple portions is attached to one of the two ends of the front portion to be freely rotatable via a hinge. It should be noted that an ear piece portion is attached to the tip of each of the temple portions. The image display devices are attached to the frame. More specifically, however, each of the image display devices need only be attached, for example, to the temple portion.

Further, in the present invention, nose pads can be attached to the frame. That is, when the head mounted display of the present invention is viewed as a whole, the assembly made up of a frame and nose pads has the same structure as ordinary eyeglasses. There may or may not be a rim portion. The frame can be made of the same material as ordinary eyeglasses such as metals, alloys, plastics or a combination thereof. The nose pads can have a well-known configuration and structure.

As described earlier, the imaging device can be attached at the center of the front portion. More specifically, the imaging device includes, for example, a solid-state imaging element and lens. The solid-state imaging element includes a CCD (Charge Coupled Device) or CMOS (Complementary Metal Oxide Semiconductor) sensor. The wiring from the imaging device need only be connected, for example, to one of the image display devices (or image forming devices) via the front portion and, further be included in the wiring extending from the image display device (or image forming device).

In the head mounted display of the present invention, it is preferred, from the viewpoint of design and ease of wearing, for example, that the wiring (e.g., signal wires and power wires) from the two image forming devices should extend externally from the tips of the ear piece portions via the inside of the temple and ear piece portions and be connected to the control device (control circuit). Further, each of the image forming devices can include a headphone portion so that the wiring for the headphone portion from each of the image forming devices extends to the headphone portion from the tip of the ear piece portion via the inside of the temple and ear piece portions. Among examples of the headphone portion are an inner ear headphone portion and an ear canal headphone portion. More specifically, it is preferred that the wiring for the headphone portion should extend from the tip of the ear piece portion and go around and behind the concha to reach the headphone portion.

The head mounted display of the present invention can be used to display, for example, subtitles for movies and so on; explanatory text and closed captions relating to an image synchronous with the image; description of the targets and explanatory text for describing the content, progress, background and so on of plays, kabuki plays, noh plays, kyogen plays, operas, concerts, ballets, theaters, amusement parks, museums, sightseeing spots, holiday resorts, sightseeing guides and so on; various descriptions, symbols, signs, marks, emblems, designs and so on relating to the operation, manipulation, maintenance, disassembly and so on of the targets such as various devices; various descriptions, symbols, signs, marks, emblems, designs and so on relating to the targets such as persons or goods; and closed captions. In plays, kabuki plays, noh plays, kyogen plays, operas, concerts, ballets, theaters, amusement parks, museums, sightseeing spots, holiday resorts, sightseeing guides and so on, text in the form of images relating to the targets need only be displayed by the image display devices at proper timings. More specifically, for example, the second image signal is transmitted to the image display devices according to the progress of the movie or play, according to the predetermined schedule, based on the time allocation and by the manipulation of the worker or under control, for example, of a computer so that images (text) are displayed by the image display devices. Further, when various descriptions relating to the targets such as various devices, persons or goods are displayed, it is possible to display such various descriptions relating to the targets such as various devices, persons or goods prepared in advance with the image display devices by providing the imaging device in the head mounted display, capturing images of the targets such as various devices, persons or goods by the image capturing devices and analyzing the content of captured images in the image display devices. Alternatively, the head mounted display of the present invention can be used as a stereoscopic display device.

Then, the second image signal supplied to the image forming devices can contain not only text data but also, for example, luminance data relating to text to be displayed, or chromaticity data, or luminance data and chromaticity data. Luminance data can be that for the luminance of the predetermined region including the target as seen through the optical device. The chromaticity data can be that for the chromaticity of the predetermined region including the target as seen through the optical device. Containing luminance data relating to text as described above makes it possible to control the luminance (brightness) of text to be displayed. Containing chromaticity data relating to text as described above makes it possible to control the chromaticity (color) of text to be displayed. Containing luminance data and chromaticity data relating to text as described above makes it possible to control the luminance (brightness) and chromaticity (color) of text to be displayed. When luminance data for the luminance of the predetermined region including the target as seen through the optical device is used, the luminance data value need only be set so that the higher the luminance of the predetermined region including the target as seen through the optical device, the higher the luminance value of the image (that is, the brighter the image is displayed). Further, when chromaticity data for the chromaticity of the predetermined region including the target as seen through the optical device is used, the chromaticity data value need only be set so that the chromaticity of the predetermined region including the target as seen through the optical device and that of the image to be displayed are in a roughly complementary color relationship. The term "complementary color" refers to colors that are opposite on the color circle. Red and green, yellow and purple, and blue and orange are complementary colors. Complementary color is also used to refer to a color that leads to reduced chroma such as white for light and black for an object when a given color is mixed with another color at an appropriate ratio. However, the complementarity of visual effect of colors arranged side by side and the complementarity of mixed colors are different. Complementary color is also referred to as a contrasting color or opposite color. It should be noted, however, that unlike opposite color that directly indicates the pairing color, the meaning of complementary color encompasses a slightly broader range. Combining complementary colors is synergistically effective in that the two colors enhance each other. This is called a complementary color harmony.

Example 1

Figure 2:
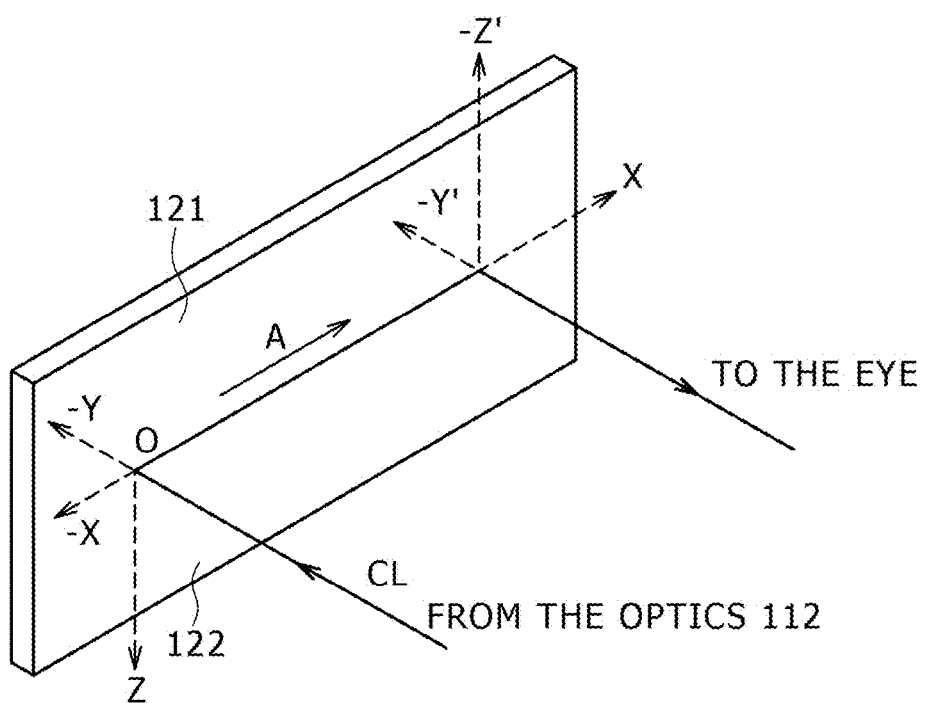
FIG. 2 is a diagram schematically illustrating the propagation of light in a light guide plate making up the image display device of the head mounted display in example 1.
Figure 3:
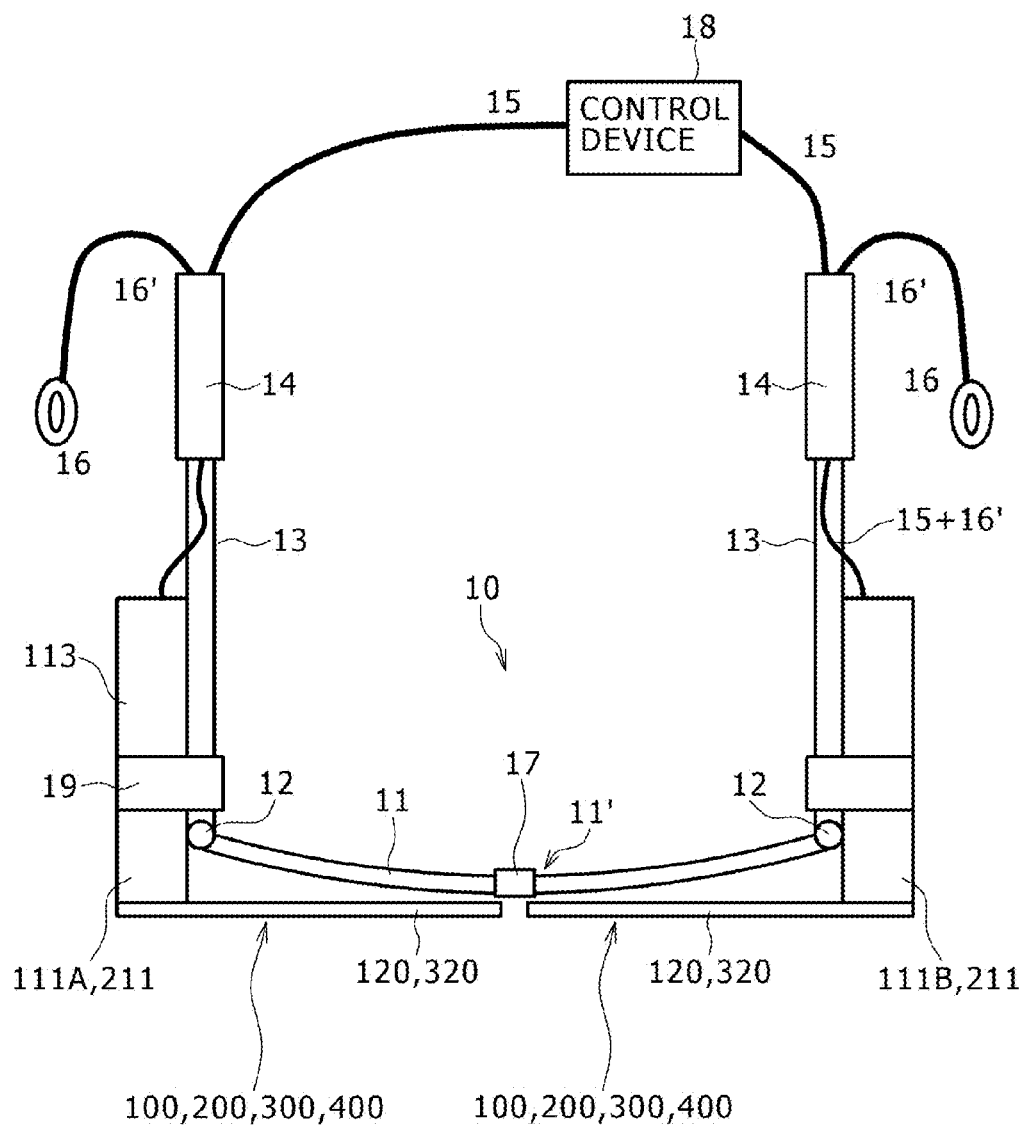
FIG. 3 is a schematic diagram of the head mounted display in example 1 as seen from above.
Figure 4:
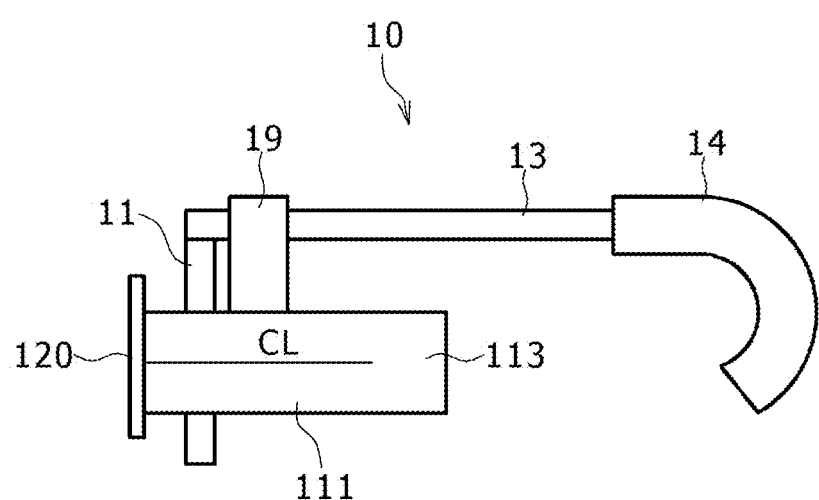
FIG. 4 is a schematic diagram of the head mounted display in example 1 as seen from the side.
Figure 5:
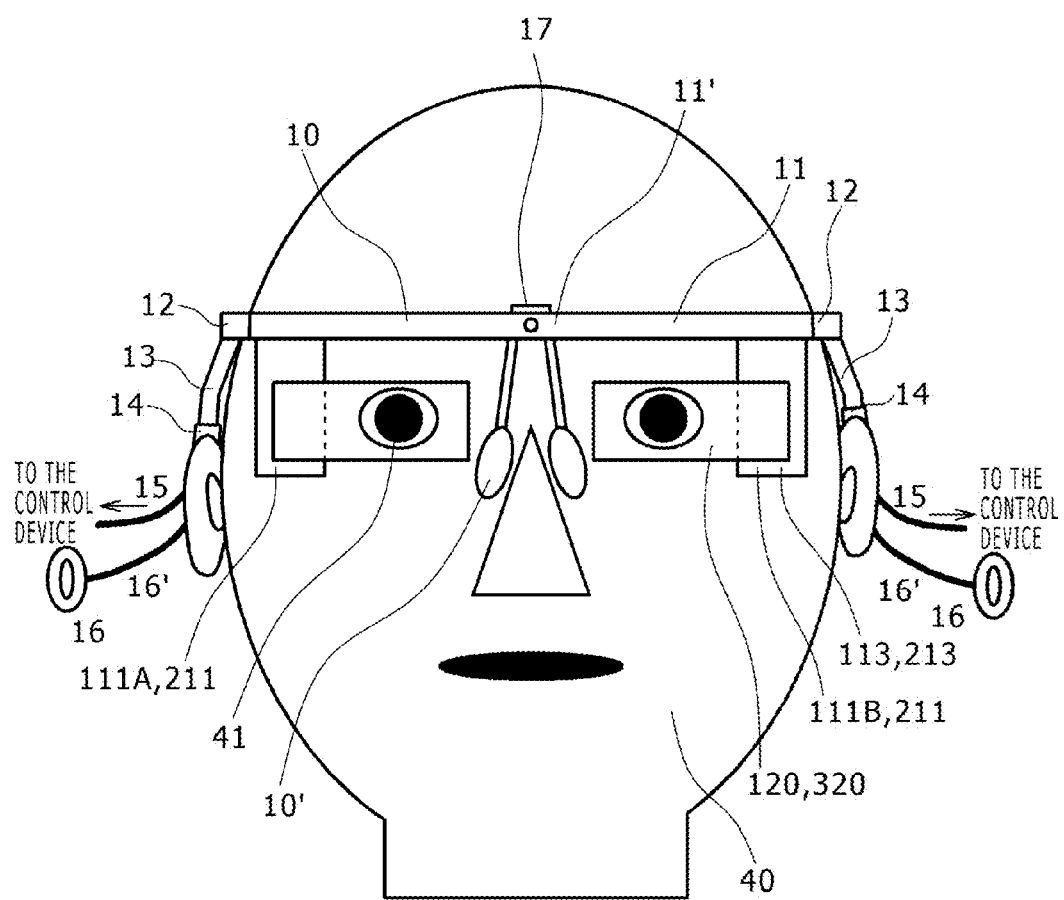
FIG. 5 is a schematic diagram of the head mounted display in example 1 as seen from the front.
Figure 6:
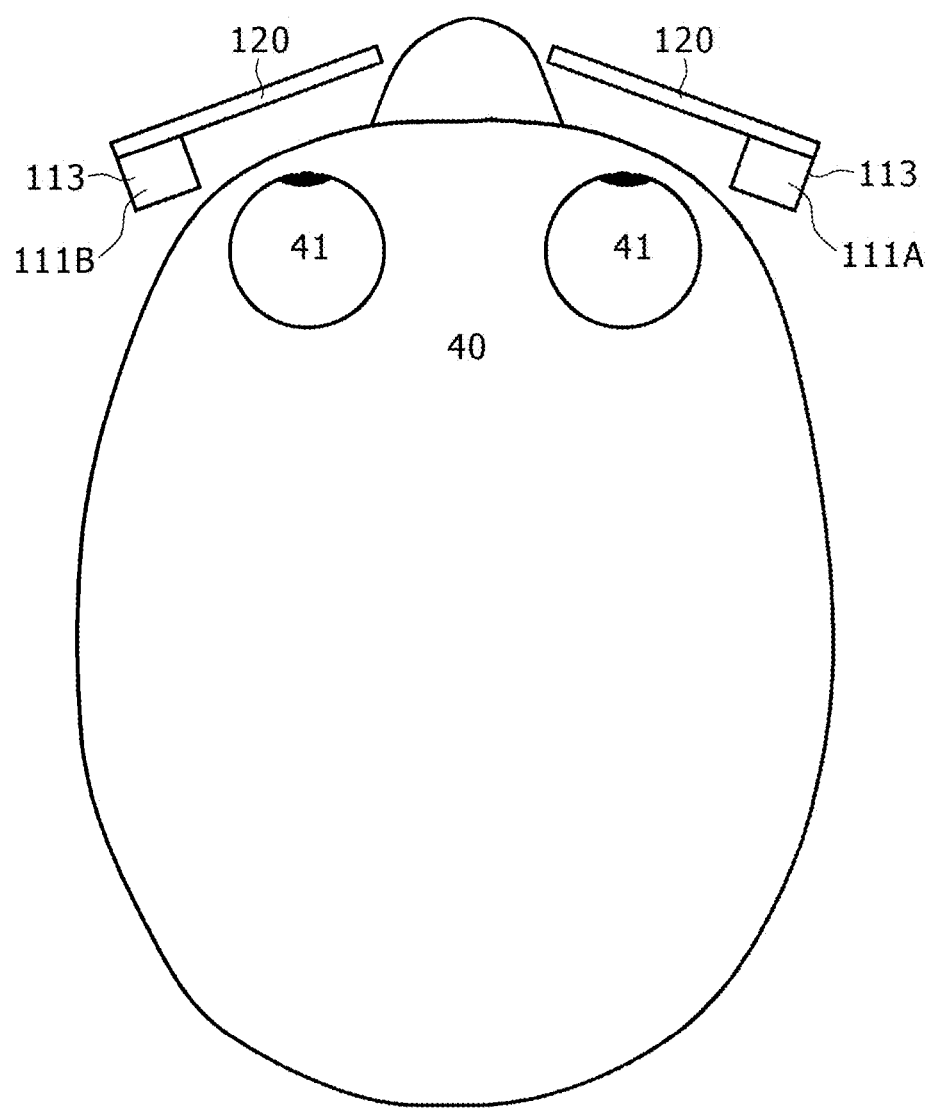
FIG. 6 is a diagram of the head mounted display in example 1 worn on the head of the viewer as seen from above (where only the image display devices are shown and the frame is not shown)
Figure 7:
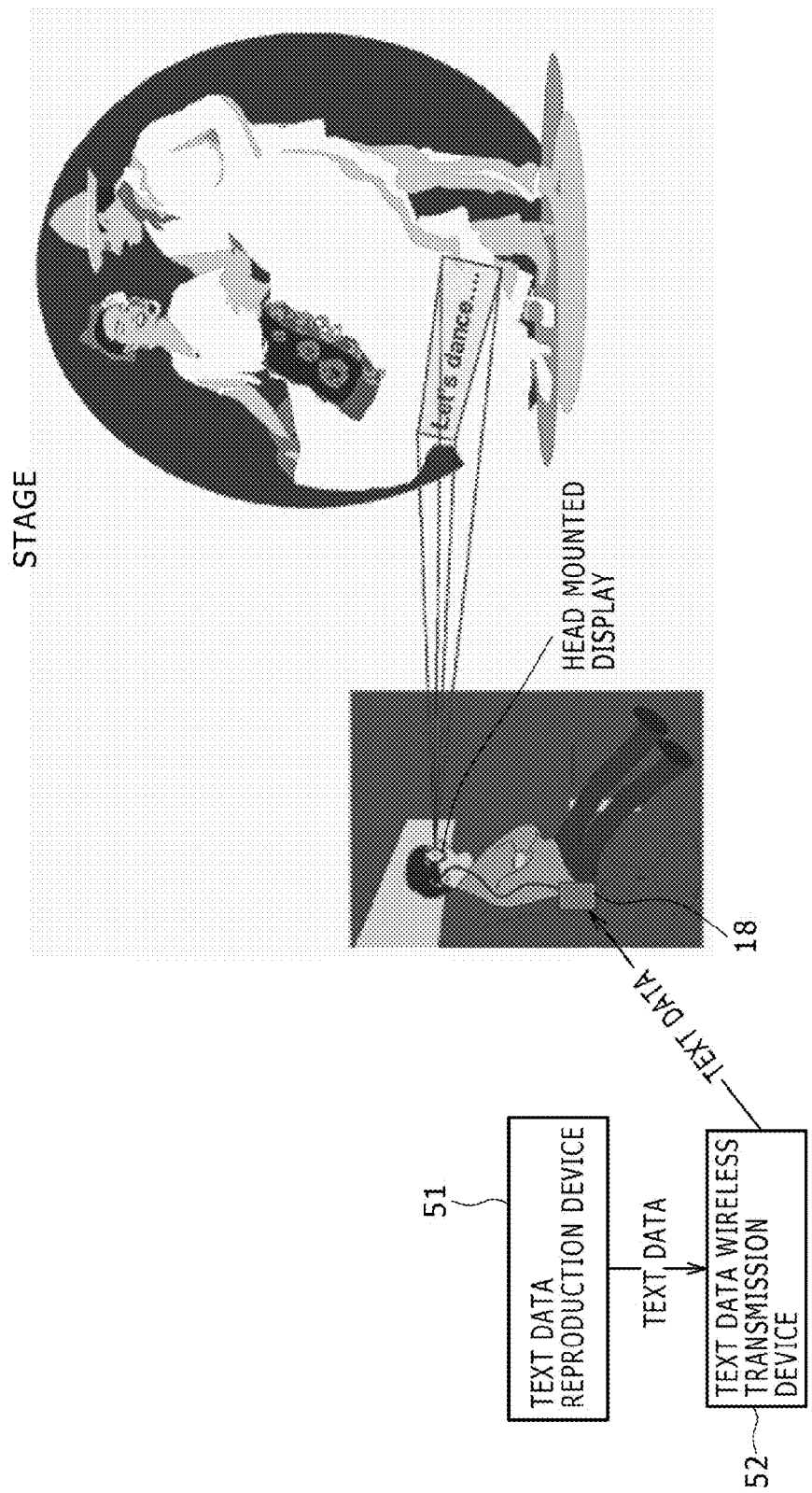
FIG. 7 is a conceptual diagram of the head mounted display in example 1 while being used.

Example 1 relates to the optical position adjustment methods for a head mounted display according to the first and second embodiments of the present invention. FIG. 1 illustrates a conceptual diagram of the image display device of the head mounted display in example 1. Further, FIG. 2 schematically illustrates the propagation of light in the light guide plate making up the image display device of the head mounted display in example 1. FIG. 3 illustrates a schematic diagram of the head mounted display in example 1 as seen from above. FIG. 4 illustrates a schematic diagram of the head mounted display in example 1 as seen from the side. Still further, FIG. 5 illustrates a schematic diagram of the head mounted display in example 1 as seen from the front. FIG. 6 illustrates a diagram of the head mounted display in example 1 worn on the head of the viewer as seen from above (where only the image display devices are shown and the frame is not shown). FIGS. 7 and 8 illustrate conceptual diagrams of the head mounted display in example 1 while being used.

The head mounted display in example 1 or each of those in examples 2 to 8 which will be described later includes:
(a) an eyeglass frame 10 worn on the head of the viewer, and
(b) two image display devices 100, 200, 300, 400 or 500 for the right and left eyes attached to the frame 10. Each of the image display devices 100, 200, 300, 400 or 500 includes:
(A) an image forming device 111 or 211, and
(B) an optical device (light guiding section) 120, 320 or 520 adapted to receive, guide and emit light emitted from the image forming device 111 or 211. It should be noted that each of the image display devices 100, 200, 300, 400 or 500 further includes:
(C) an optics 112 or 254 (parallel beam emission optics) adapted to shape light, emitted from the image forming device 111 or 211, into parallel beams. Here, the optics 112 or 254 is provided between the image forming device 111 or 211 and optical device 120, 320 or 520. The light flux shaped into parallel beams by the optics 112 or 254 enters the optical device 120, 320 or 520, is guided therein and then emitted. The image forming device 111 or 211 displays a single color (e.g., green) image. On the other hand, the optical device 120, 320 or 520 is see-through. More specifically, at least the portions (more specifically, the light guide plate 121 or 321 and a second deflection section 140 or 340) of the optical device opposed to the eyes of the viewer are see-through.

It should be noted that, in example 1 or each of examples 2 to 8 which will be described later, the point where a central beam CL, emitted from the center of the image forming device 111 or 211 and passing through the node of the optics 112 or 254 on the side of the image forming device, enters the optical device 120, 320 or 520 is an optical device center O. The axis that passes through the optical device center O and is parallel to the axial direction of the optical device 120, 320 or 520 is the X axis. The axis that passes through the optical device center O and matches the normal of the optical device 120, 320 or 520 is the Y axis. It should be noted that the center of the first deflection section 130 or 330 which will be described next is the optical device center O.

Then, the optical device 120 or 320 in example 1 or each of examples 2 to 6 which will be described later includes:
(a) the light guide plate 121 or 321 adapted to emit incident light that has propagated therein by total reflection;

(b) the first deflection section 130 or 330 adapted to deflect incident light on the light guide plate 121 or 321 in such a manner that the incident light is totally reflected in the light guide plate 121 or 321; and (c) the second deflection section 140 or 340 adapted to deflect light, that has propagated in the light guide plate 121 or 321 by total reflection, a plurality of times so as to cause the light, that has propagated therein by total reflection, to be emitted from the light guide plate 121 or 321.

Here, in example 1, the first and second deflection sections 130 and 140 are provided in the light guide plate 121. The first deflection section 130 reflects light incident on the light guide plate 121. The second deflection section 140 transmits and reflects, a plurality of times, light that has propagated in the light guide plate 121 by total reflection. That is, the first deflection section 130 serves as a reflecting mirror, and the second deflection section 140 serves as a half mirror. More specifically, the first deflection section 130 provided in the light guide plate 121 is made of aluminum (Al) and includes a light reflecting film (king of mirror) adapted to reflect incident light on the light guide plate 121. On the other hand, the second deflection section 140 provided in the light guide plate 121 includes a multi-layer stacked structure having a number of stacked dielectric films. The stacked dielectric films include, for example, TiO$_2$ films as high dielectric constant films and SiO$_2$ films as low dielectric constant films. A multi-layer stacked structure having a number of stacked dielectric films is disclosed in JP-T-2005-521099. FIG. 1 illustrates six layers of stacked dielectric films. However, the number of stacked dielectric films is not limited thereto. A flake made of the same material as the light guide plate 121 is sandwiched between one stacked dielectric film and another. It should be noted that the first deflection section 130 reflects (or diffracts) the parallel beams incident on the light guide plate 121 so that the parallel beams incident on the light guide plate 121 are totally reflected in the light guide plate 121. On the other hand, the second deflection section 140 reflects (or diffracts), a plurality of times, the parallel beams that have propagated in the light guide plate 121 by total reflection, after which the beams are emitted, still in the form of parallel beams, to the eye 41 of the viewer from the light guide plate 121.

In order to provide the first deflection section 130, it is only necessary to first cut, in the light guide plate 121, a portion 124 on which to provide the first deflection section 130 so as to provide, on the light guide plate 121, a slope on which to form the first deflection section 130, next vacuum-vapor-deposit a light reflecting film on the slope and finally bond the first deflection section 130 to the portion 124 that has been cut in the light guide plate 121. In order to provide the second deflection section 140, on the other hand, it is only necessary to prepare a multi-layer stacked structure having a number of the same material (e.g., glass) as the light guide plate 121 and stacked dielectric films (e.g., films that can be formed by vacuum vapor deposition), cut, in the light guide plate 121, a portion 125 on which to provide the second deflection section 140 so as to form a slope, bond the multi-layer stacked structure to the slope, and tidy the outer shape, for example, by polishing. This provides the optical device 120 whose light guide plate 121 incorporates the first and second deflection sections 130 and 140.

Here, in example 1 or each of examples 2 to 6 which will be described later, the light guide plate 121 or 321 made of optical glass or plastic material has two parallel surfaces (first surface 122 or 322 and second surface 123 or 323) that extend parallel to the direction (X axis) of propagation of light in the light guide plate 121 or 321 by total reflection.

The first surface 122 or 322 and second surface 123 or 323 are opposed to each other. The parallel beams enter the first surface 122 or 322 that corresponds to a light incidence surface, propagate in the light guide plate by total reflection and are emitted from the second surface 123 or 323 that corresponds to a light emission surface. It should be noted, however, that the light guide plate 121 or 321 is not limited to this configuration. Instead, the second surface 123 or 323 may be a light incidence surface, and the first surface 122 or 322 may be a light emission surface.

In example 1 or example 3 which will be described later, the image forming devices 111 are each an image forming device having a first configuration and include a plurality of pixels arranged in a two-dimensional matrix. More specifically, each of the image forming devices 111 includes a reflection spatial light modulator 150 and light source 153. The light source 153 includes a light-emitting diode adapted to emit white light. Each of the image forming devices 111, as a whole, is housed in an enclosure 113 (shown by a dashed-dotted line in FIG. 1 or 12A). The enclosure 113 has an opening (not shown) so that light is emitted from the optics (parallel beam emission optics or collimating optics) 112 via the opening. The reflection spatial light modulator 150 includes a liquid crystal display device (LCD) 151 and polarizing beam splitter 152. The liquid crystal display 151 is an LCOS liquid crystal display device (LCD) serving as a light bulb. The polarizing beam splitter 152 reflects part of light from the light source 153 to guide it onto the liquid crystal display device 151 and transmits part of light reflected by the liquid crystal display device 151 to guide it onto the optics 112. The liquid crystal display device 151 includes a plurality of (e.g., 640 by 480) pixels (liquid crystal cells) arranged in a two-dimensional matrix. The polarizing beam splitter 152 has a well-known configuration and structure. Non-polarized light emitted from the light source 153 strikes the polarizing beam splitter 152. The p-polarized component passes through the polarizing beam splitter 152, causing this component to be emitted externally. On the other hand, the s-polarized component is reflected by the polarizing beam splitter 152 to enter the liquid crystal display device 151 where the component is reflected therein and emitted therefrom. Here, of light emitted from the liquid crystal display device 151, that emitted from the pixels adapted to display "white" contains a p-polarized component in large quantities, and that emitted from the pixels adapted to display "black" contains an s-polarized component in large quantities. Therefore, of light emitted from the liquid crystal display device 151 and striking the polarizing beam splitter 152, the p-polarized component passes through the polarizing beam splitter 152 and is guided onto the optics 112. On the other hand, the s-polarized component is reflected by the polarizing beam splitter 152 back to the light source 153. The optics 112 includes, for example, a convex lens. The image forming device 111 (more specifically, liquid crystal display device 151) is provided at the focal distance position of the optics 112 to produce parallel beams.

The frame 10 includes a front portion 11, two temple portions 13 and ear piece portions (also called ear pads) 14. The front portion 11 is provided at the front of the viewer. Each of the temple portions 13 is attached to one of the two ends of the front portion 11 to be freely rotatable via a hinge 12. Each of the ear piece portions 14 is attached to the tip of one of the temple portions 13. Further, nose pads 10' are attached to the frame 10. That is, the assembly made up of the frame 10 and nose pads 10' basically has the same structure as ordinary eyeglasses. Still further, each of the enclosures 113 is attached to one of the temple portions 13 by an attachment member 19. The frame 10 is made of a metal or plastic. It should be noted that each of the enclosures 113 may be attached to one of the temple portions 13 by the attachment member 19 so as to be freely attachable and detachable. Further, for the viewers who wear their own eyeglasses, each of the enclosures 113 may be attached to one of the temple portions of their eyeglasses by the attachment member 19 so as to be freely attachable and detachable.

Still further, wiring (e.g., signal wires and power wires) 15 from image forming devices 111A and 111B extend externally from the tips of the ear piece portions 14 via the inside of the temple portion 13 and ear piece portion 14 and be connected to a control device (control circuit, control section) 18. Further, each of the image forming devices 111A and 111B includes a headphone portion 16 so that wiring 16' for the headphone portion 16 from each of the image forming devices 111A and 111B extends to the headphone portion 16 from the tip of the ear piece portion 14 via the inside of the temple portion 13 and ear piece portion 14. More specifically, the wiring 16' for the headphone portion extends from the tip of the ear piece portion 14 and go around and behind the concha to reach the headphone portion 16. Such a configuration provides an uncluttered head mounted display that does not give any disorderly impression in the arrangement of the headphone portion 16 and wiring 16'.

An imaging device 17 is attached to a center portion 11' of the front portion 11 by a proper attachment member (not shown). The imaging device 17 includes a solid-state imaging element and lens (not shown). The signal from the imaging device 17 is transmitted to the image forming device 111A via wiring (not shown) extending from the imaging device 17.

A description will be given below of the optical position adjustment method of the head mounted display in example 1. It should be noted that the following tasks are performed during assembly of the head mounted display, or at regular or irregular intervals, for this optical adjustment method.

That is, the first image signal (input image signal or input image data) is controlled that is supplied to the image forming device 111A or 111B making up at least one of the image display devices (two image display devices 100, 200, 300, 400 or 500 for the right and left eyes in example 1). More specifically, an image signal (input image signal or input image data) that allows for a kind of test pattern to be displayed as a first image signal is transmitted in a wired or wireless fashion to the control device 18. Then, the control device 18 processes the first image signal for image display, and an image is generated by the image forming device 111A or 111B. This image finally reaches the eyes of a worker 40 wearing the head mounted display via the optics 112 or 254 and optical device 120, 320 or 520. The test pattern is, for example, a combination of horizontally, vertically and diagonally extending lines.

Figures 21A, 21B:
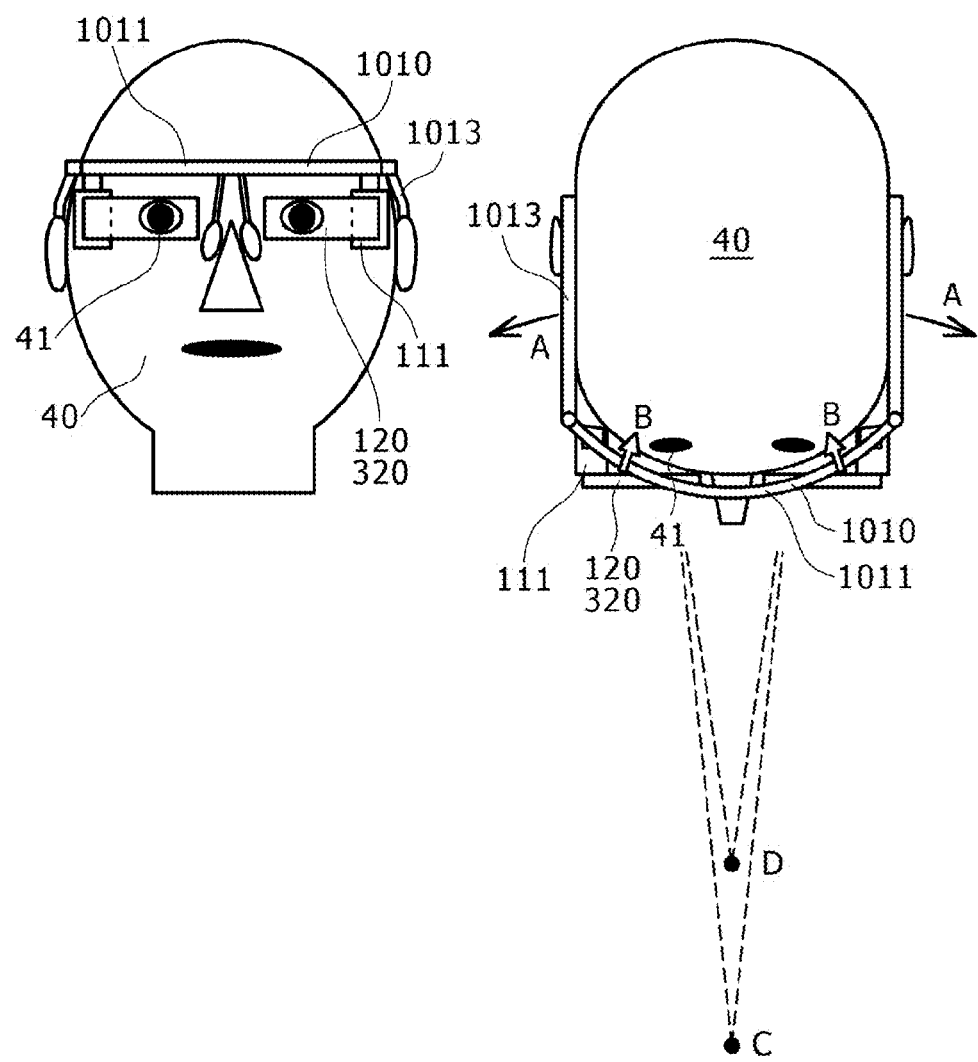
FIGS. 21A and 21B are diagrams schematically illustrating the existing image display device attached to an eyeglass frame.

Then, the worker 40 moves the images, displayed by the image display devices 100, 200, 300, 400 or 500 for the left and right eyes, horizontally and vertically or rotates them via the control device 18, and more specifically, using the switches (not shown) provided on the control device 18 so that the images are superimposed one on top of another, for example, at an infinitely distant place (or desired position). That is, the images are moved, for example, horizontally or vertically or rotated so that a point "C" in FIG. 21B is at an infinitely distant place (or desired position). Thus, the first image signal is controlled by manipulating the switches provided on the control device 18. That is, a display position correction signal is generated by the control device 18 and added to the first image signal.

Figure 9A:
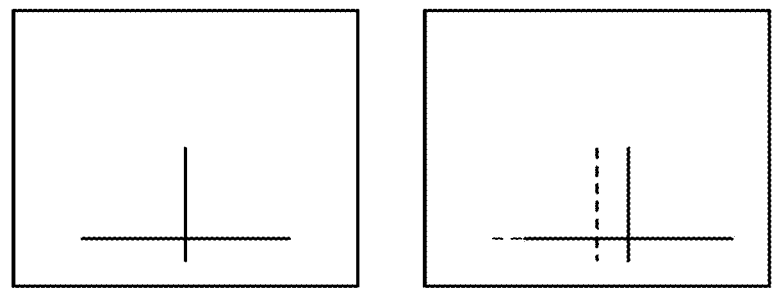
FIGS. 9A to 9C are schematic diagrams illustrating the displacement of images displayed by the image display devices for the left and right eyes.
Figure 9B:
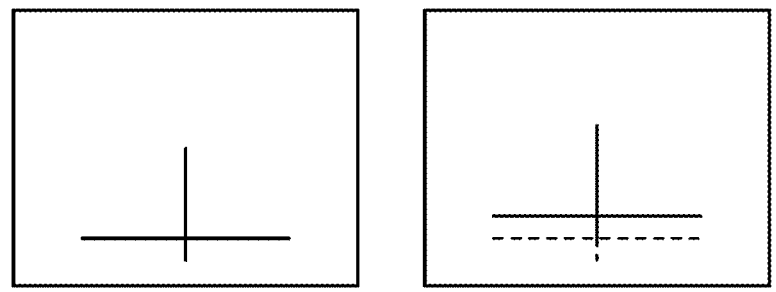
Figure 9C:
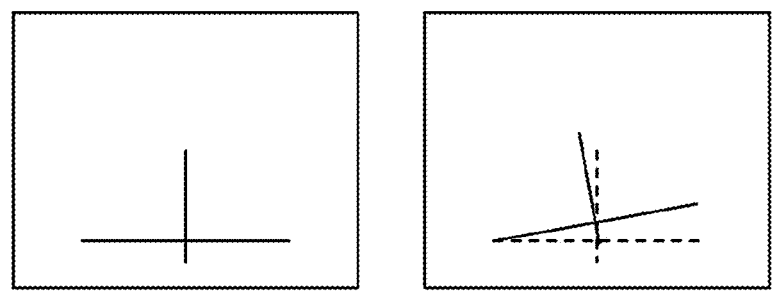

FIG. 9A schematically illustrates that the images displayed by the image display devices 100, 200, 300, 400 or 500 for the left and right eyes are horizontally displaced from each other, for example, at an infinitely distant place (or desired position). FIG. 9B schematically illustrates that the images are vertically displaced from each other. FIG. 9C schematically illustrates that the images are displaced from each other due to their rotation relative to each other. Here, the diagrams on the right of FIGS. 9A to 9C illustrate the images displayed by the image display device 100, 200, 300, 400 or 500 for the right eye, and those on the left of FIGS. 9A to 9C illustrate the images displayed by the image display device 100, 200, 300, 400 or 500 for the left eye. Further, the dotted lines in the diagrams on the right of FIGS. 9A to 9C illustrate the images displayed by the image display device 100, 200, 300, 400 or 500 for the left eye superimposed on those displayed by the image display device 100, 200, 300, 400 or 500 for the right eye.

Here, in order to move the test pattern horizontally, it is only necessary for the control device 18 to generate a display position correction signal adapted to change the horizontal position of the image based on the first image signal by i pixels in the positive or negative direction. Alternatively, it is only necessary for the control device 18 to generate a signal adapted to change the horizontal synchronizing signal timing by i pixels in the positive or negative direction. In order to move the test pattern vertically, on the other hand, it is only necessary for the control device 18 to generate a display position correction signal adapted to change the vertical position of the image based on the first image signal by j pixels in the positive or negative direction. Alternatively, it is only necessary for the control device 18 to generate a signal adapted to change the vertical synchronizing signal timing by j pixels in the positive or negative direction. That is, the test pattern can be moved by delaying or advancing the read position of the image memory. Alternatively, the test pattern can be moved by changing the vertical and horizontal synchronizing signal timings. Further, in order to rotate the test pattern, it is only necessary for the control device 18 to generate a display position correction signal adapted to rotate the image based on a well-known method.

Then, the display position correction signal obtained when the images, displayed by the image display devices 100, 200, 300, 400 or 500 for the left and right eyes, are superimposed one on top of another at an infinitely distant place (or desired position), is stored in the control device 18 as a display position control signal. These tasks can be performed by using the buttons (not shown) provided on the control device 18. The image displayed on the optical device 120, 320 or 520 making up at least one of the image display devices 100, 200, 300, 400 or 500 is controlled, thus adjusting the mutual positions of the two images displayed by the image display devices 100, 200, 300, 400 or 500.

Then, the display position control signal, obtained from the display position correction signal, is stored in the control device (control circuit or control section) 18. A second image signal (e.g., text data) reproduced, for example, by a text data reproduction device 51 or image data/text data reproduction device 51' is transmitted wirelessly to the control device 18 via a text data wireless transmission device 52. Then, the second image signal is processed by the control device 18 for image display. That is, the control device 18 adds the display position control signal to the second image signal. Thus, the positions of the images (various images based on the second image signal) displayed on the optical device 120, 320 or 520 making up at least one of the image display devices 100, 200, 300, 400 or 500 can be controlled so that the images, displayed by the image display devices 100, 200, 300, 400 or 500 for the left and right eyes, are superimposed one on top of another at an infinitely distant place (or desired position).

Further, the second image signal (input image signal or input image data) is controlled that is supplied to the image forming device 111A or 111B making up at least one of the image display devices (two image display devices 100, 200, 300, 400 or 500 for the right and left eyes in example 1) based on the distance from the head mounted display to the target, thus adjusting the convergence angle commensurate with the distance from the head mounted display to the target.

Figure 10A:
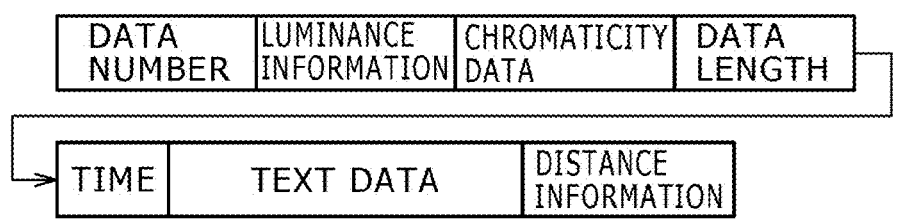
FIGS. 10A and 10B are, respectively, a conceptual diagram of a signal format including an image signal (second image signal) supplied to an image forming device together with distance information from the head mounted display to the target, and a schematic diagram for describing the adjustment of a convergence angle commensurate with the distance from the head mounted display to the target.

Here, the distance information from the head mounted display to the target is transmitted to the head mounted display from external equipment in addition to the image signal (second image signal) supplied to the image forming device 111A or 111B. FIG. 10A illustrates a conceptual diagram of such a signal format. Then, it is only necessary for the control device 18 to generate a signal (convergence angle control signal) adapted to change, based on the distance information, the horizontal position of the image based on the second image signal by k pixels in the positive or negative direction. It should be noted that it is only necessary to examine, in advance, the extent to which the convergence angle or virtual image distance changes when the horizontal position of the image changes by one pixel and store, in the control device 18, the relationship therebetween. It should also be noted that this signal and three display position control signals, i.e., one adapted to change the horizontal position of the image by i pixels in the positive or negative direction, another adapted to change the vertical position of the image by j pixels in the positive or negative direction, and still another adapted to rotate the image, are added and transmitted to the image forming device 111A or 111B. Thus, the image can be actively moved based on the distance information (or horizontal movement), thus making it possible to place the virtual image at a desired position.

Alternatively, the head mounted display may further include a distance measurement device adapted to measure the distance to the target from the head mounted display so that distance information can be obtained from the distance measurement device. For example, an imaging device with auto-focusing capability (imaging device having a passive distance measurement device) need only be used as an imaging device 17 to serve as a distance measurement device. Alternatively, buttons or switches may be provided on the control device 18 to manually set the distance to the target from the head mounted display.

Figure 10B:
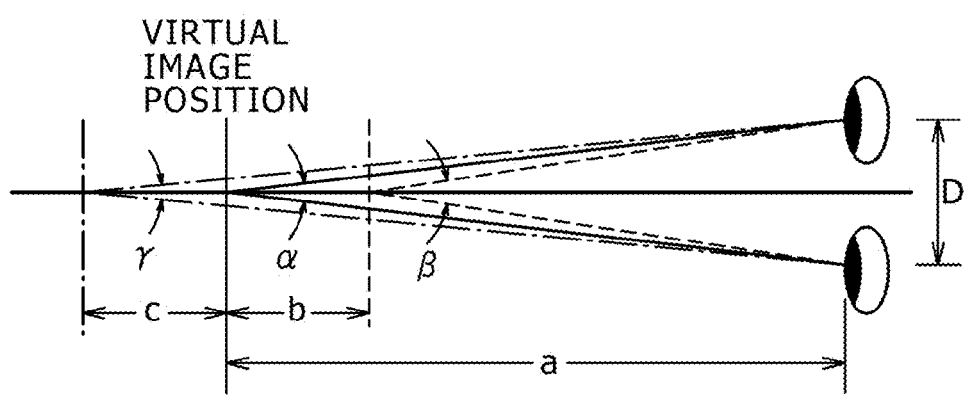

A description will be given below of the adjustment of the convergence angle commensurate with the distance to the target from the head mounted display with reference to FIG. 10B. Here, "a" is the virtual image distance of the image (text) displayed by the image display devices based on the second image signal, and "α" is the convergence angle to the image at this time. Further, "γ" is the convergence angle to the image when the virtual image position is moved farther by distance "c" from the virtual image distance "a," and "β" is the convergence angle to the image when the virtual image position is moved closer by distance "b." Still further, "D" is the distance between the left and right eyes. Here, assuming that
D=61.5 mm and
a=4000 mm, then
α=53 minutes (53').

One pixel in the image forming device is defined to be three minutes (3'). Here, if the image display position is moved horizontally and inward by one pixel from the predetermined position, then
β=56 minutes (56'), and
b=225 mm. On the other hand, if the image display position is moved horizontally and outward by one pixel from the predetermined position,
γ=50 minutes (50'), and
c=228 mm. Further, assuming a=8000 mm, moving the image by one pixel moves the virtual image distance by about 1 m.

As described above, the convergence angle can be adjusted by horizontally moving the image display position from the predetermined position. In other words, the second image signal is controlled that is supplied to the image forming devices 111A and 111B making up the two image display devices 100, 200, 300, 400 or 500 for the right and left eyes by using not only the display position control signal but also the convergence angle control signal, thus making it possible to accurately adjust the convergence angle commensurate with the distance to the target from the head mounted display. This brings the distance between the target and viewer (audience) 40 into agreement or as close agreement as possible with the virtual image distance of the image (e.g., text) displayed by the image display devices, thus allowing for the viewer (audience) 40 watching the target to naturally watch the image displayed by the image display devices without significantly changing the focus.

It should be noted that controlling the first image signal described earlier basically provides the same change in image as described above, thus making it possible to find a display position control signal.

A luminance signal of an image to be displayed on the optical devices can be transmitted to the head mounted display from external equipment in addition to the image signal (second image signal) supplied to the image forming devices, so visibility of the displayed image can be enhanced. Alternatively, the head mounted display can further include a light reception sensor so that the luminance of the image to be displayed on the optical devices can be controlled based on luminance information of the environment (atmosphere in which the head mounted display or target is located) obtained by the light reception sensor. More specifically, among examples of the light reception sensor are a photodiode and a light reception element for exposure measurement incorporated in the imaging device 17.

When the head mounted display is used, for example, at a theater, it is only necessary to display, on the head mounted display, explanatory text for describing the content, progress, background and other information of a play and so on. However, the virtual image distance must be a desired distance. That is, the distance between the target and viewer (audience) and the virtual image distance of the image (e.g., text) displayed by the image display devices change depending on where the viewer is seated. As a result, it is necessary to optimize the virtual image distance dependently on the viewer's position. In the head mounted display in example 1, however, the convergence angle is optimized commensurate with the distance to the target from the head mounted display, thus optimizing the virtual image distance dependently on the viewer's position. Further, there are cases where one wishes to change the virtual image distance depending on the scene. In such a case, the virtual image distance can be readily changed by transmitting the distance information from the head mounted display to the target to the head mounted display from external equipment.

Alternatively, the viewer (user) can set a desired virtual image distance or position. More specifically, switches or buttons are provided on the control device 18. The viewer can place the virtual image at a desired distance or position by manipulating the switches or buttons by himself or herself. For example, if the background changes, the virtual image distance or position can be changed as desired. Such a task is need only be performed as appropriate, for example, during viewing of the target, and may be performed by the viewer and such a task is more specifically composed of causing the control device 18 to add the convergence angle control signal to the second image signal. This allows for the viewer, for example, to positively read the text such as subtitles without significantly changing his or her line of sight. Further, it is possible to readily and simultaneously display subtitles or other information suited to each of the viewers (e.g., subtitles or other information in different languages).

Here, the second image signal is digital data and prepared in advance before being displayed. The image display position need only be set where it does not obstruct the viewing of the target. More specifically, on the other hand, image display is achieved by transmitting the second image signal to the control device 18 from the text data wireless transmission device 52, for example, based on the predetermined schedule or time allocation or according to the progress of the target and under control of the computer (not shown) incorporated in the text data reproduction device 51 or image data/text data reproduction device 51'.

In the head mounted display in example 1, if the second image signal contains not only text data but also luminance data and chromaticity data relating to text to be displayed, it is possible to positively prevent text such as subtitles from becoming difficult to visually identify dependently on the background of the text. It should be noted that luminance data for the luminance of a predetermined region (e.g., region corresponding to one third of the bottom of the stage) including the targets (e.g., characters and background) as seen through the image display devices is among examples of luminance data. On the other hand, chromaticity data for the chromaticity of a predetermined region including the targets as seen through the image display devices is among examples of chromaticity data. In particular, unless the balance between the brightness of, for example, the screen or stage as seen through a see-through optical device and the brightness and color of the text displayed on the optical device falls within a given range, it may become difficult to view subtitles, screen, stage and so on in a favorable manner. However, the head mounted display in example 1 can tailor the brightness and color of text to be displayed to match the screen, stage and so on, thus making the text readily visually identifiable. That is, it is possible to positively prevent text, for example, for describing the targets viewed by the viewer (audience) from becoming difficult to visually identify dependently on the background of the text. Then, when the head mounted display in example 1 is used, for example, to view a play, it is only necessary to display text relating to the targets (e.g., explanatory text relating to the situation behind and background of the play, explanatory text about the characters and conversations of the characters) on the image display devices 100, 200, 300, 400 or 500. More specifically, it is only necessary, for example, to transmit text data to the image display devices 100, 200, 300, 400 or 500 by the manipulation of the worker or under control, for example, of a computer so as to display the text on the image display devices 100, 200, 300, 400 or 500.

Further, it is said that a fixed virtual image position causes eye fatigue. The reason for this is that a fixed focus leads to less eyeball movement. Therefore, changing the virtual image distance or moving the virtual image position properly is effective in reducing eye fatigue. That is, the position of the virtual image formed by the two optical devices or the distance to the virtual image formed by the two optical devices from the two optical devices (virtual image distance) may be changed over time. More specifically, it is only necessary to change, for example, every five minutes, the horizontal position of the image, for example, by two pixels in the positive direction on the image forming device, for example, for a period of one minute, and then restore the image to its original position.

As described above, the method in example 1 controls the first image signal supplied to the image forming device making up at least one of the image display devices, thus controlling the position of the image displayed on the optical device making up at least one of the image display devices and thereby adjusting the mutual positions of the two images. This makes it possible to optically adjust, with ease, the two image display devices for the right and left eyes, i.e., adjust, with ease, the optical positions of the two image display devices so as to provide a desired image, for example, during manufacture of a binocular head mounted display.

Example 2

Figure 11:
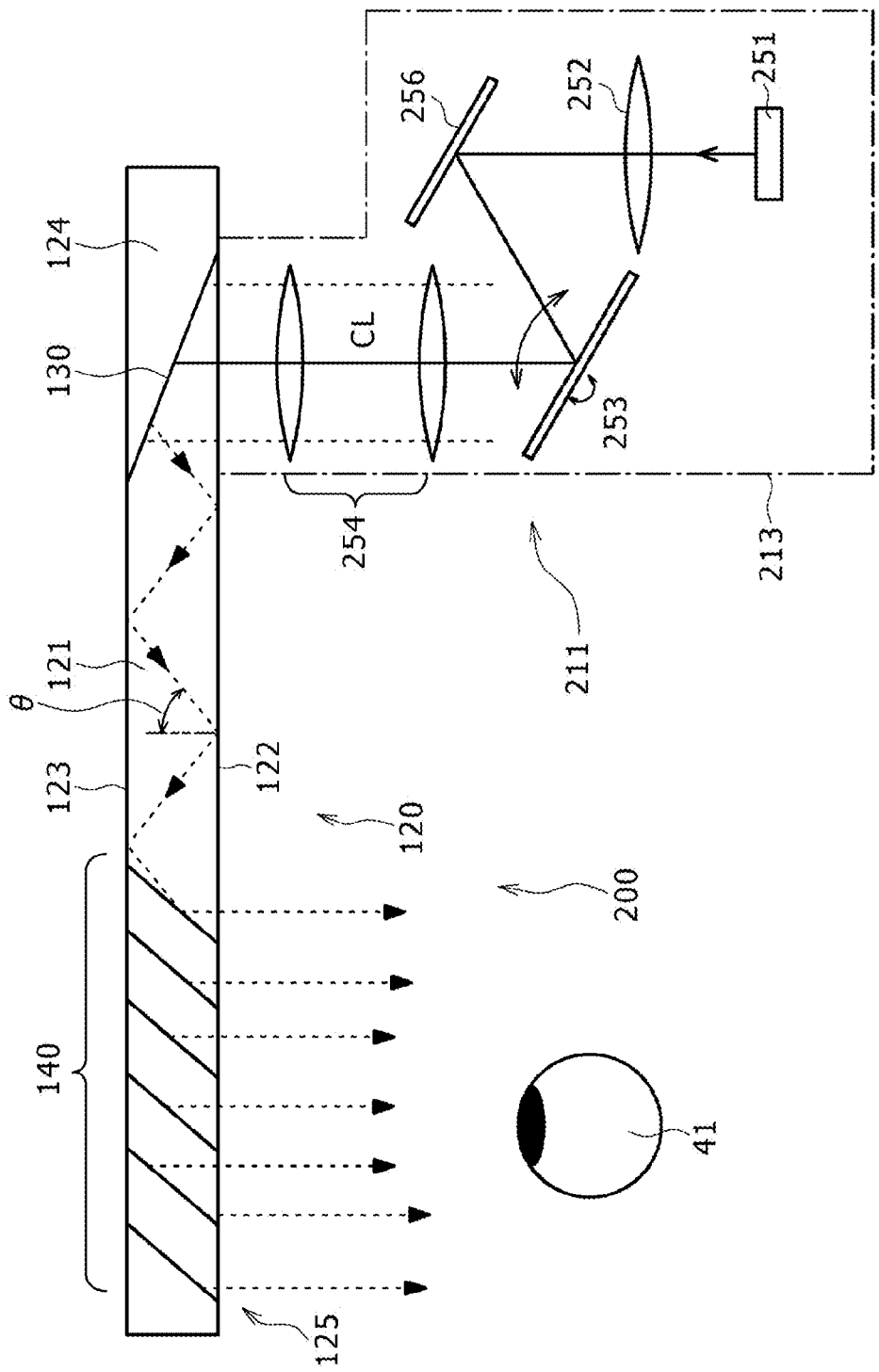
FIG. 11 is a conceptual diagram of the image display device of the head mounted display in example 2.

Example 2 is a modification of the image display device in example 1. As illustrated in FIGS. 11 and 13 showing, respectively, conceptual diagrams of the image display devices 200 and 400 of the head mounted displays in example 2 and example 4 which will be described later, the image forming device 211 includes an image forming device having a second configuration. That is, the image forming device 211 includes a light source 251 and a scanning section 253 adapted to scan parallel beams emitted from the light source 251. More specifically, the image forming device 211 includes the light source 251, a collimating optics 252, the scanning section 253 and relay optics 254. The collimating optics 252 shapes light, emitted from the light source 251, into parallel beams. The scanning section 253 scans the parallel beams emitted from the collimating optics 252. The relay optics 254 relays and emits the parallel beams scanned by the scanning section 253. It should be noted that the image forming device 211, as a whole, is housed in an enclosure 213 (shown by a long dashed short dashed line in FIGS. 11 and 13). The enclosure 213 has an opening (not shown) so that light is emitted from the relay optics 254 via the opening. Each of the enclosures 213 is attached to one of the temple portions 13 by the attachment member 19.

The light source 251 includes a light-emitting element adapted to emit white light. Light emitted from the light source 251 enters the collimating optics 252 having, as a whole, positive optical power. Light is emitted from the collimating optics 252 in the form of parallel beams. These parallel beams are reflected by a total reflection mirror 256 and then scanned horizontally and vertically by the scanning section 253 to form a kind of two-dimensional image, thus generating virtual images (number of pixels may be, for example, the same as in example 1). The scanning section 253 includes a MEMS device which is a two-dimensionally rotatable micromirror capable of scanning incident parallel beams two-dimensionally. Light from the virtual pixels passes through the relay optics (parallel beam emission optics) 254, after which light flux shaped into parallel beams enters the optical device 120. The relay optics 254 includes a well-known relay optics.

The optical device 120, adapted to receive light flux shaped into parallel beams by the relay optics 254, guide it therein and emit it, has the same configuration and structure as the optical device described in example 1. Therefore, the detailed description thereof is omitted. On the other hand, the head mounted display in example 2 has the same configuration and structure as that in example 1 except for the above differences. Therefore, the detailed description thereof is omitted.

Example 3

Figures 12A, 12B:
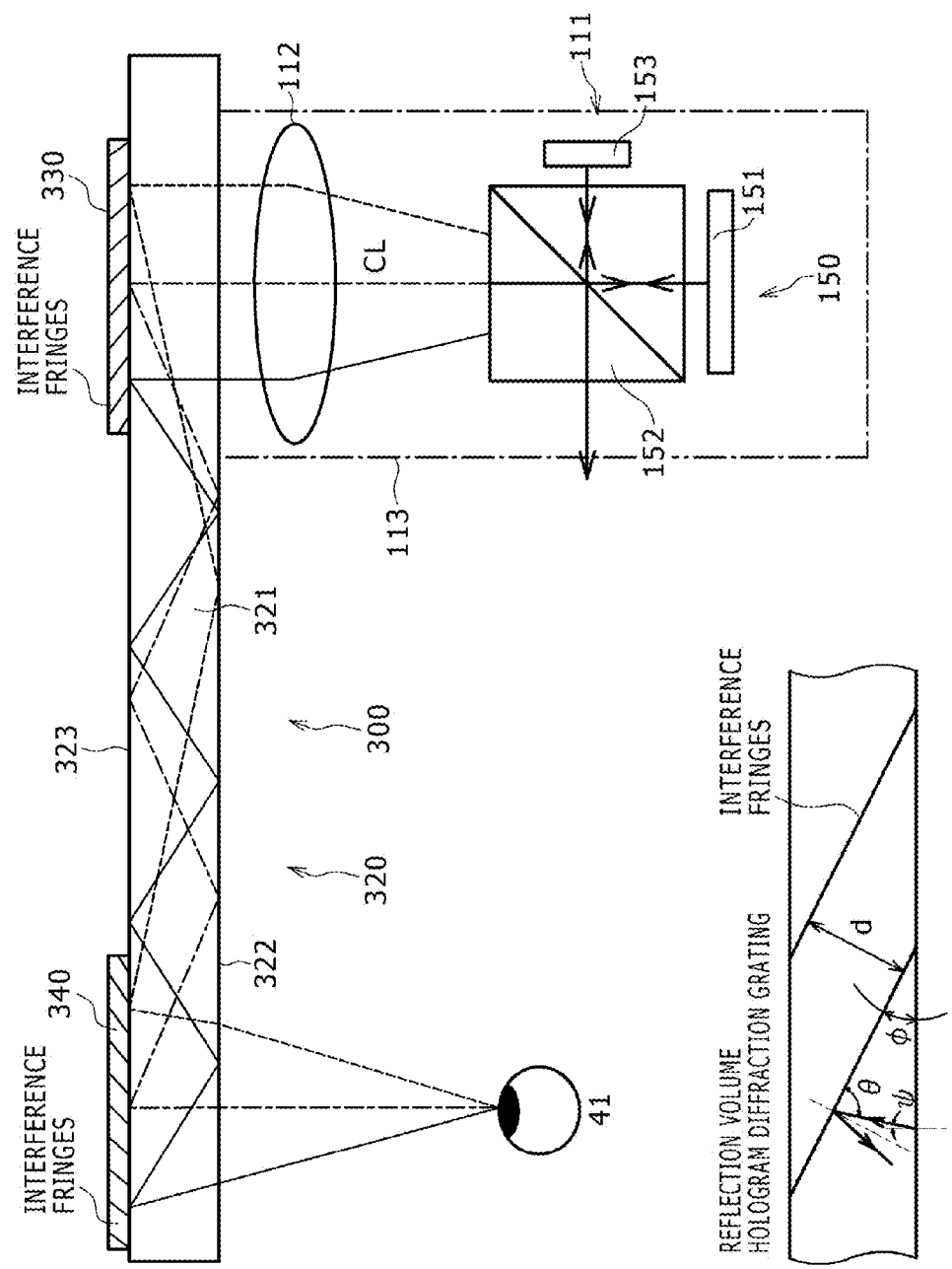
FIGS. 12A and 12B are conceptual diagrams of the image display device of the head mounted display in example 3.

Example 3 is also a modification of the image display device in example 1. FIG. 12A illustrates a conceptual diagram of the image display device 300 of the head mounted display in example 3. FIG. 12B illustrates a schematic sectional view showing, in an enlarged fashion, part of a reflection volume holographic diffraction grating. In example 3, the image forming device 111 includes an image forming device having a first configuration as in example 1. On the other hand, the optical device 320 has the same basic configuration and structure as the optical device 120 in example 1 except for the differences in configuration and structure of the first and second deflection section.

In example 3, the first and second deflection section are provided on the front surface of the light guide plate 321 (more specifically, the second surface 323 of the light guide plate 321). The first deflection section diffracts incident light on the light guide plate 321, and the second deflection section diffracts, a plurality of times, light that has propagated in the light guide plate 321 by total reflection. Here, the first and second deflection section each include a diffraction grating element and specifically a reflection diffraction grating element, and more specifically a reflection volume holographic diffraction grating. In the description given below, the first deflection section including a reflection volume holographic diffraction grating will be referred to as a "first diffraction grating member 330" for convenience, and the second deflection section including a reflection volume holographic diffraction grating will be referred to as a "second diffraction grating member 340" for convenience.

In example 3 or in example 4 which will be described later, the first and second diffraction grating members 330 and 340 each include a single layer of diffraction grating. It should be noted that interference fringes for one wavelength range (or wavelength) are formed on each diffraction grating layer made of a photopolymer material. The interference fringes are formed by an existing method. The pitch between the interference fringes formed on the diffraction grating layer (diffraction optical element) is constant. The interference fringes are linear and parallel to the Z axis. It should be noted that the axes of the first and second diffraction grating members 330 and 340 are parallel to the X axis, and that the normals thereof are parallel to the Y axis.

FIG. 12B illustrates a schematic partial sectional view showing, in an enlarged fashion, a reflection volume holographic diffraction grating. Interference fringes having a slant angle φ are formed on the reflection volume holographic diffraction grating. Here, the term "slant angle φ" refers to the angle formed between the surface of the reflection volume holographic diffraction grating and interference fringes. The interference fringes are formed on the reflection volume holographic diffraction grating from the inside to the surface thereof. The interference fringes satisfy the Bragg condition. Here, the term "Bragg condition" refers to the condition in which Equation (A) is satisfied. In Equation (A), m is a positive integer, λ is the wavelength, d is the grating surface pitch (spacing between the virtual planes each including an interference fringe along the normal), and Θ is the complementary angle of the incidence angle of light on the interference fringes. Further, when light finds its way into the diffraction grating member at an incidence angle ψ, the relationship between Θ, the slant angle φ and the incidence angle ψ is as shown in Equation (B).

$$m \cdot \lambda = 2 \cdot d \cdot \sin(\Theta) \quad (A)$$

$$\Theta = 90° - (\phi + \psi) \quad (B)$$

The first diffraction grating member 330 is provided on (bonded to) the second surface 323 of the light guide plate 321 as described earlier. The first diffraction grating member 330 reflects or diffracts the parallel beams incident on the light guide plate 321 so that the incident parallel beams are totally reflected in the light guide plate 321. Further, the second diffraction grating member 340 reflects or diffracts, a plurality of times, the parallel beams that have propagated in the light guide plate 321 by total reflection and emits the beams from the first surface 322 of the light guide plate 321 still in the form of parallel beams.

The light guide plate 321 emits the parallel beams that have propagated therein by total reflection. At this time, the number of times the parallel beams are totally reflected before reaching the second diffraction grating member 340 differs depending on the angle of view because the light guide plate 321 is thin and because the optical path in the light guide plate 321 is long. More specifically, of the parallel beams incident on the light guide plate 321, the number of times of reflection of those incident at an angle in the direction of approaching the second diffraction grating member 340 is smaller than that of those incident at an angle in the direction of distancing from the second diffraction grating member 340. The reason for this is that the parallel beam diffracted or reflected by the first diffraction grating member 330 and incident on the light guide plate 321 at an angle in the direction of approaching the second diffraction grating member 340 forms a smaller angle with the normal of the light guide plate 321 when striking the inner surface of the light guide plate 321 during propagation in the light guide plate 321 than that incident on the light guide plate 321 at an angle in the opposite direction. Further, the shape of the interference fringes formed in the second diffraction grating member 340 and that of the interference fringes formed in the first diffraction grating member 330 are symmetrical with respect to the virtual plane vertical to the axis of the light guide plate 321.

The light guide plate 321 in example 4 which will be described later has the same configuration and structure as the light guide plate 321 described above. The head mounted display in example 3 has the same configuration and structure as that in example 1 except for the above differences. Therefore, the detailed description thereof is omitted.

Example 4

Example 4 is a modification of the image display device in example 3. FIG. 13 illustrates a conceptual diagram of the image display device of the head mounted display in example 4. The light source 251, collimating optics 252, scanning section 253, parallel beam emission optics (relay optics) 254 and other components of each of the image display devices 400 have the same configuration and structure as their counterparts in example 2 (image forming device having a second configuration). On the other hand, the optical device 320 in example 4 has the same configuration and structure as that in example 3. The head mounted display in example 4 has the same configuration and structure as those in examples 1 and 2 except for the above differences. Therefore, the detailed description thereof is omitted.

Example 5

Figure 14A:
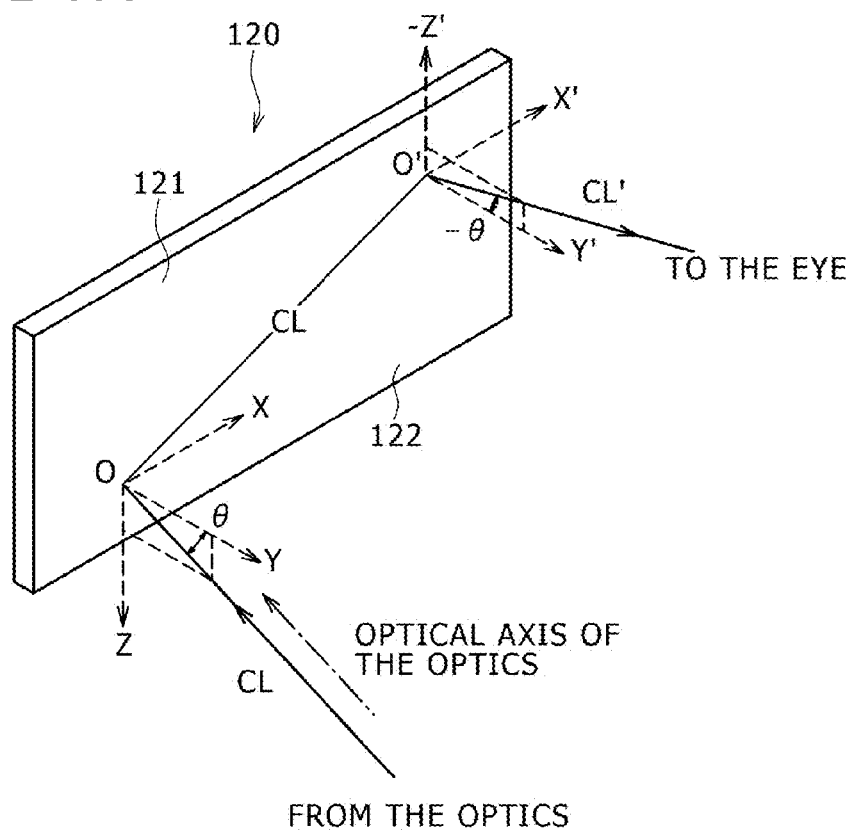
FIGS. 14A and 14B are, respectively, a diagram schematically illustrating the propagation of light in the light guide plate making up the image display device of the head mounted display in example 5, and a conceptual diagram of the arrangement of the light guide plate and other components.
Figure 14B:
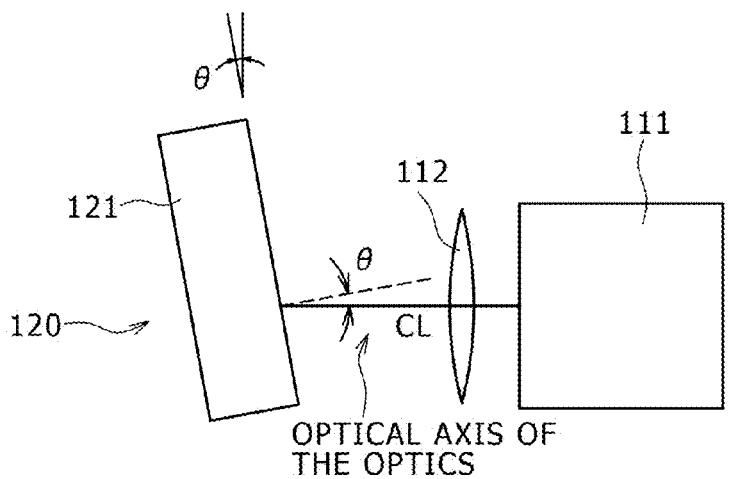
Figure 15:
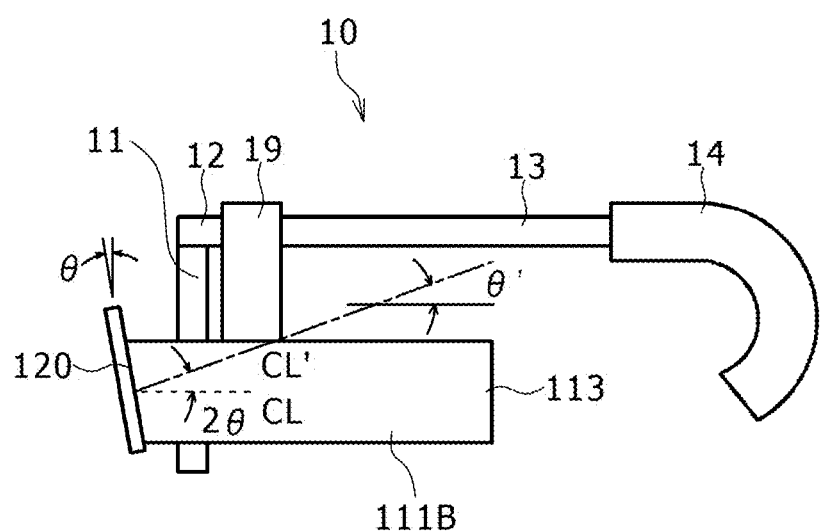
FIG. 15 is a schematic diagram of the head mounted display in example 5 as seen from the side.

Example 5 is a modification of the image display devices in examples 1 to 4. FIGS. 14A and 14B illustrate conceptual diagrams of the arrangement of the light guide plate and other components making up the image display device of the head mounted display in example 5. FIG. 15 illustrates a schematic diagram of the head mounted display in example 5 as seen from the side.

In examples 1 to 4, the central beam CL, emitted from the center of the image forming device 111 or 211 and passing through the node of the optics 112 or 254 on the side of the image forming device, is designed to vertically strike the light guide plate 121 or 321 in the image display devices 100 or 300 as illustrated in FIG. 2. That is, the central beam CL is designed to enter the light guide plate 121 or 321 at a zero incidence angle. In this case, the center of the displayed image matches the vertical direction of the first surface 122 or 322 of the light guide plate 121 or 321.

That is, in an image display device as typified by the image display device 100, the central beam CL emitted from the center of the image forming device 111 located in the optical axis of the collimating optics 112 is converted first into an approximately parallel beam by the collimating optics 112 and then vertically enters the first surface (incidence surface) 122 of the light guide plate 121 as illustrated in FIG. 2. Then, the beam proceeds along a propagation direction A while at the same time being totally reflected between the first and second surfaces 122 and 123 by the first deflection section 130. Next, the central beam CL is reflected or diffracted by the second deflection section 140 and emitted vertically from the first surface 122 of the light guide plate 121, thus reaching the eye 41 of the viewer (audience).

Figure 20:
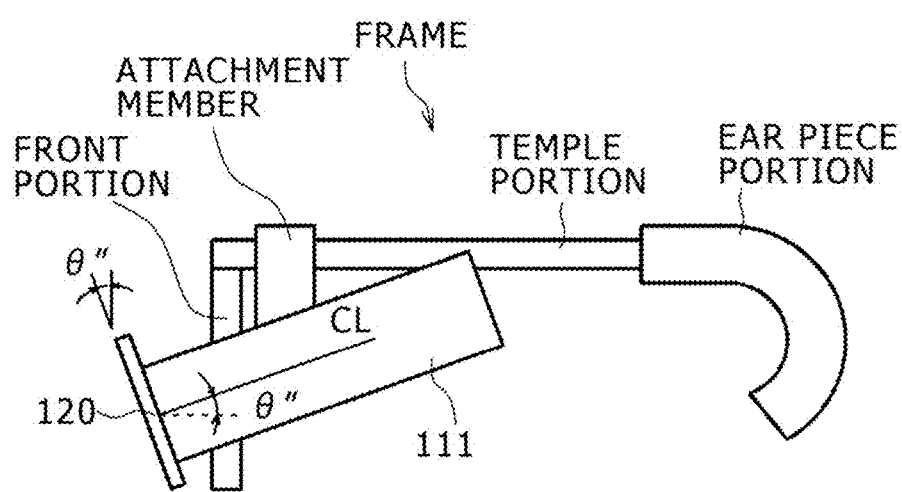
FIG. 20 is a schematic diagram of one type of the head mounted display in example 1 as seen from the side.

In order to prevent the optical device 120, 320 or 520 from obstructing the viewing of the horizontally located target by the viewer (audience) in a see-through head mounted display, it is preferred that the optical device 120, 320 or 520 should be provided slightly lower than the horizontal line of sight of the viewer. In such a case, the image display devices 100 or 300, as a whole, is provided lower than the horizontal line of sight of the viewer. Incidentally, in such a configuration, the image display device 100 as a whole must be tilted by angle θ as illustrated in FIG. 20. This leads to the limitation of the angle θ at which the image display device 100 can be tilted or a lower degree of design freedom because of the relationship with the attachment portion (temple portion) of the eyeglass type frame for wearing on the head of the viewer. Therefore, it is further preferred that the image display devices should allow for arrangement with a high degree of freedom and offer a high degree of design freedom.

In example 5, the central beam CL intersects the XY plane at angle θ other than zero degree. Further, the central beam CL is included in the YZ plane. Still further, in example 5 or example 6 which will be described later, the optical axis of the optics 112 or 254 is included in the YZ plane and intersects the XY plane at an angle other than zero degree, and more specifically, at angle θ (refer to FIGS. 14A and 14B). Further, in example 5 or example 6 which will be described later, assuming that the XY plane matches the horizontal plane, the angle θ at which the central beam CL intersects the XY plane is an elevation angle. That is, the central beam CL proceeds toward the XY plane from under the same plane to strike the same plane. Then, the XY plane intersects the vertical plane at an angle other than zero degree, and more specifically, at angle θ.

Figure 16A:
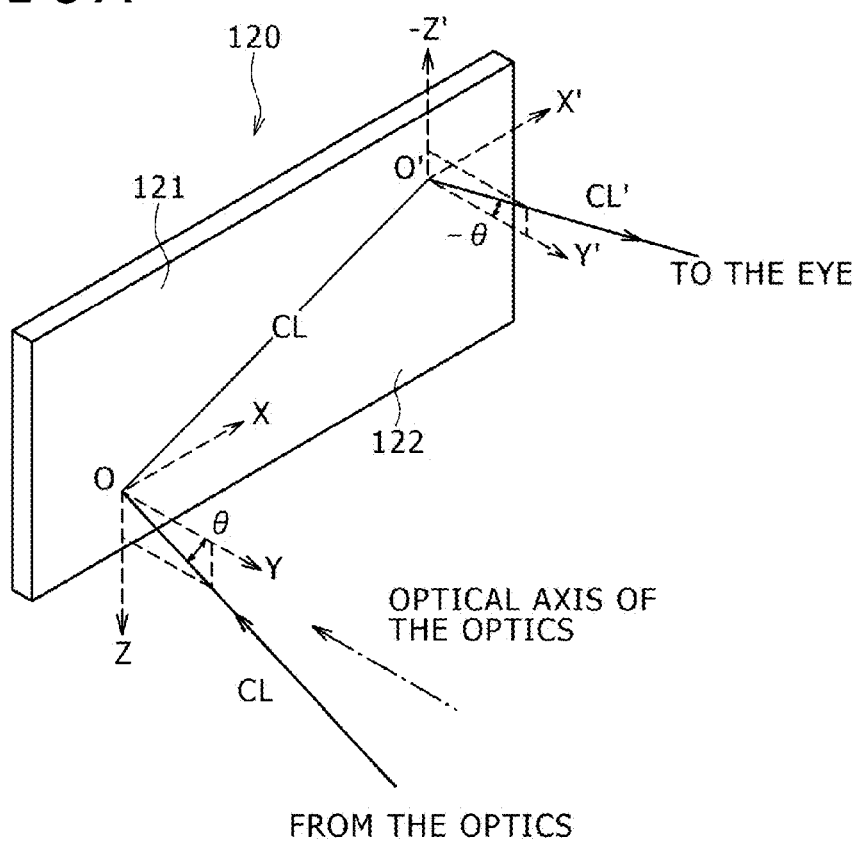
FIGS. 16A and 16B are, respectively, a diagram schematically illustrating the propagation of light in the light guide plate making up the image display device of the head mounted display in example 6, and a conceptual diagram of the arrangement of the light guide plate and other components.

In example 5, θ is five degrees. More specifically, the central beam CL (shown by a dotted line in FIG. 15) is included in the horizontal plane. Then, the optical device 120, 320 or 520 is tilted relative to the vertical plane by an angle θ. In other words, the optical device 120, 320 or 520 is tilted relative to the horizontal plane by an angle of (90−θ) degrees. Further, a central beam CL' (shown by a long dashed short dashed line in FIG. 15) emitted from the optical device 120, 320 or 520 is tilted relative to the horizontal plane by an angle 2θ. That is, when the viewer watches the target at an infinitely distant place in the horizontal direction, the central beam CL' emitted from the optical device 120, 320 or 520 and enters the eyes of the viewer forms a depression angle θ' (=2θ) (refer to FIG. 15). The angle formed between the central beam CL' and the normal of the optical device 120, 320 or 520 is θ. In FIG. 14A or FIG. 16A which will be described later, the point where the central beam CL' is emitted from the optical device 120, 320 or 520 is denoted by O', and the axes that pass through the point O' and are parallel to the X, Y and Z axes are denoted respectively by the X', Y' and Z' axes.

In the image display devices in example 5, the central beam CL intersects the XY plane at the angle (θ) other than zero degree. Here, the central beam CL' that is emitted from the optical device and enters the eyes of the viewer (audience) forms a depression angle θ' where the following relationship holds:

θ'=2θ

In the example shown in FIG. 20, on the other hand, the image display device as a whole need be tilted by an angle θ" to provide the same depression angle. Here, the following relationship holds between θ" and θ:

θ"=2θ

As a result, the optical device must be tilted relative to the vertical axis by 2θ in the example shown in FIG. 20. In example 5, on the other hand, it is only necessary to tilt the optical device relative to the vertical axis by θ and maintain the image forming device horizontal. Therefore, the limitation on the angle at which the image display device is to be attached to the attachment portion of the eyeglass type frame is less stringent, thus providing a high degree of design freedom. Further, the optical device is tilted less relative to the vertical surface than in the example shown in FIG. 20, thus making it unlikely that external light may be reflected by the optical device to enter the eye of the viewer (audience). This provides high quality image display.

The head mounted display in example 5 has the same configuration and structure as those in examples 1 to 4 except for the above differences. Therefore, the detailed description thereof is omitted.

Example 6

Figure 16B:
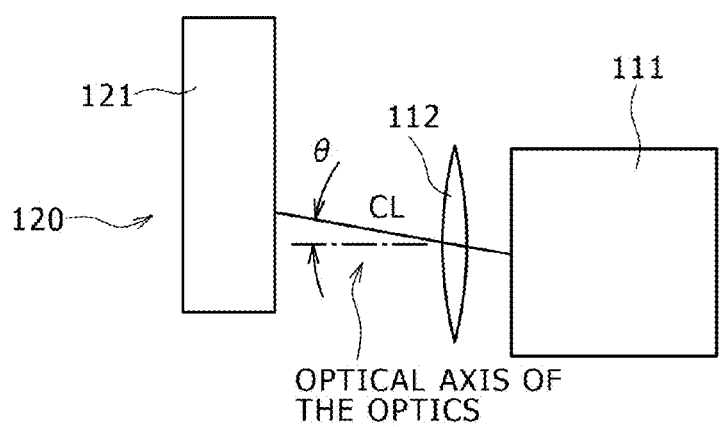

Example 6 is a modification of the image display device in example 5. FIGS. 16A and 16B are conceptual diagrams of the arrangement of the light guide plate and other components making up the image display device in example 6. Here, in example 6, the optical axis of the optics (parallel beam emission optics or collimating optics) 112 is parallel to the YZ and XY planes and passes through a position off the center of the image forming device 111. Thanks to such a configuration, the central beam CL is included in the YZ plane and intersects the XY plane at the elevation angle θ. The head mounted display in example 6 has the same configuration and structure as those in examples 1 to 5 except for the above differences. Therefore, the detailed description thereof is omitted.

Example 7

Figure 17:
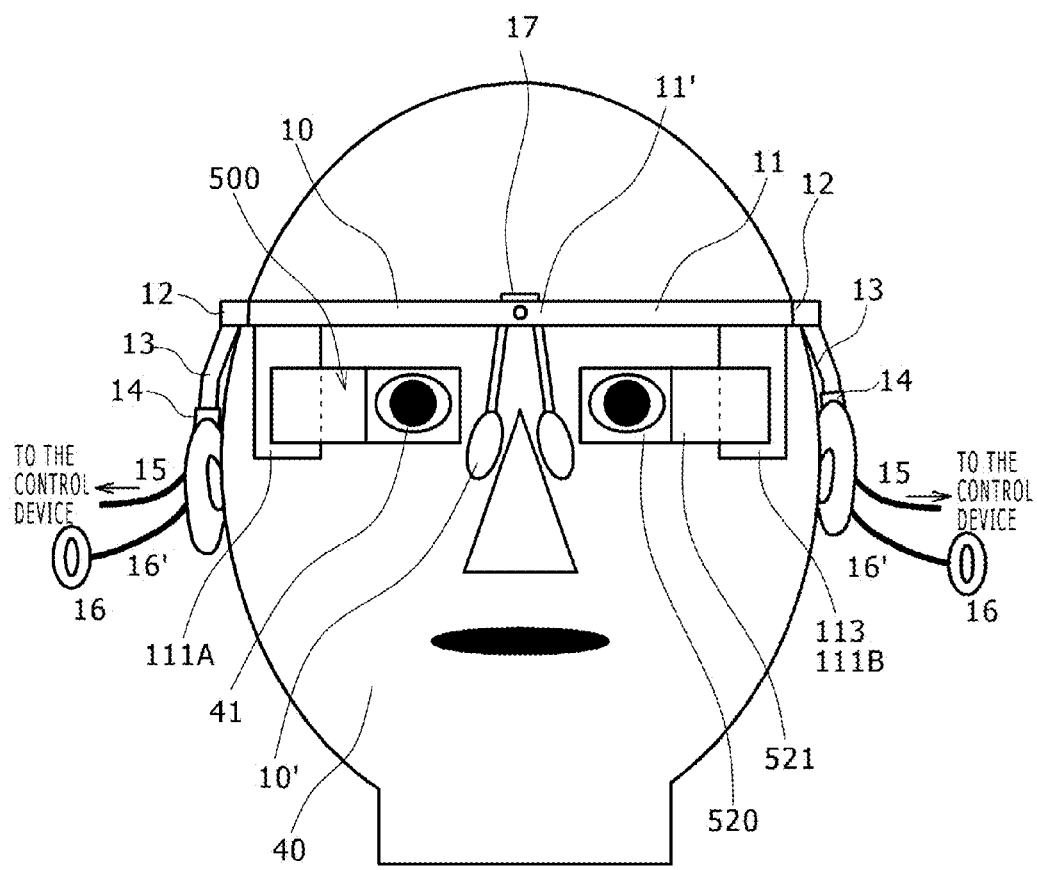
FIG. 17 is a schematic diagram of the head mounted display in example 7 as seen from the front.
Figure 18:
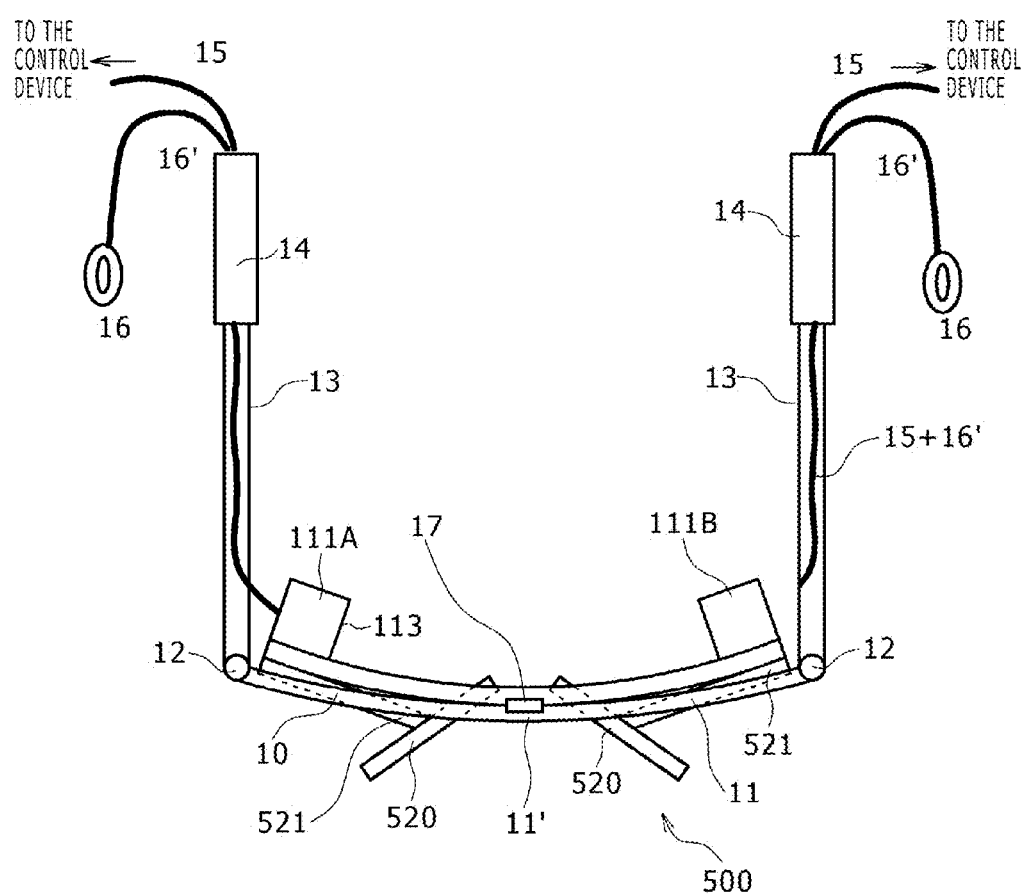
FIG. 18 is a schematic diagram of the head mounted display in example 7 as seen from above.

Example 7 is also a modification of the image display device in example 1. FIG. 17 illustrates a schematic diagram of the head mounted display in example 7 as seen from the front. FIG. 18 illustrates a schematic diagram of the head mounted display in example 7 as seen from above.

In example 7, the optical devices 520 each include a half mirror adapted to receive light emitted from the image forming device 111A or 111B and emit light toward the eye 41 of the viewer 40. It should be noted that light emitted from the image forming device 111A or 111B propagates in a transparent member 521 such as glass plate or plastic plate and enter the optical device 520 (half mirror). Alternatively, however, light emitted from the image forming device 111A or 111B may propagate in the air and enter the optical device 520 (half mirror). Still alternatively, the image forming devices 211 described in example 2 may be used as image forming devices.

Each of the image forming devices 111A and 111B is, for example, screwed to the front portion 11. Further, the transparent member 521 is attached to each of the image forming devices 111A and 111B, and the optical device 520 (half mirror) is attached to each of the transparent members 521. The head mounted display in example 7 has the same configuration and structure as those in examples 1 to 6 except for the above differences. Therefore, the detailed description thereof is omitted.

Example 8

Figure 19:
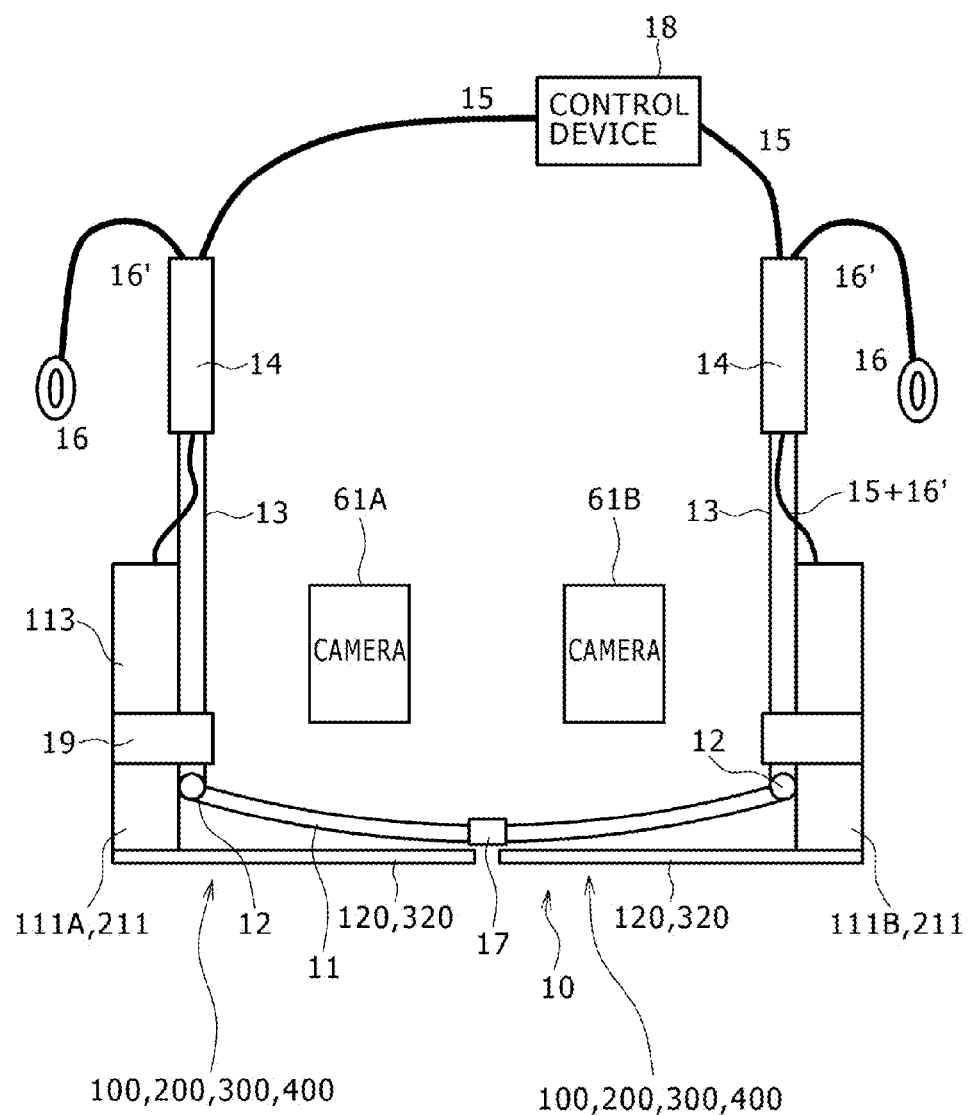
FIG. 19 is a schematic diagram of the head mounted display in example 8 as seen from above for describing the optical position adjustment method of the head mounted display according to a third embodiment of the present invention.

Example 8 relates to the optical position adjustment methods of a head mounted display according to the third and fourth embodiments. FIG. 19 illustrates a schematic diagram of the head mounted display in example 8 as seen from above for describing the optical position adjustment method of a head mounted display.

In example 8, the images to be displayed on the optical devices 120, 320 or 520 are captured with imaging devices (cameras) 61A and 61B. The images obtained by the imaging devices 61A and 61B are, for example, those shown in FIG. 9A, 9B or 9C. Then, the displacements of the images obtained by the imaging devices 61A and 61B from reference positions are found.

Here, the term "reference positions" refers to the image capture positions of the imaging devices (cameras) 61A and 61B when predetermined images displayed on the optical devices 120, 320 or 520 are captured with the associated imaging devices (cameras) 61A and 61B assuming that the image forming devices 111 or 211 are attached at the correct positions. The predetermined images can be obtained by transmitting, to the control device 18, an image signal (input image signal or input image data) serving as a first image signal that allows for a kind of test pattern to be displayed, processing the first image signal in the control device 18 for image display and generating the image in the image forming devices. If the image forming devices 111 or 211 are attached at incorrect positions, the image capture positions obtained by the imaging devices (cameras) 61A and 61B when the predetermined images displayed on the optical devices 120, 320 or 520 are captured with the associated imaging devices (cameras) 61A and 61B are displaced from the reference positions.

Tasks adapted to eliminate the displacement may be performed by the control device 18 or an external computer connected to the control device 18. The first image signal is controlled that is supplied to the image forming device 111 or 211 making up at least one of the image display devices so as to eliminate the displacement, thus adjusting the mutual positions of the two images as in example 1. That is, a display position correction signal is found that eliminates the displacement. More specifically, a worker manipulates the switches or buttons on the control device 18 to move the test pattern horizontally and vertically and rotating it, thus overlaying the image on the reference position. Then, it is only necessary to find and determine the display position correction signal based on the horizontal, vertical and rotary movements when the image is overlaid on the reference position. Alternatively, if the horizontal, vertical and rotary displacements of the image from the reference position are found by a computer, these displacements serve as a display position correction signal adapted to overlay the image on the reference position. Then, this display position correction signal is stored in the control device as a display position control signal.

Except for the above, the optical position adjustment method of a head mounted display in example 8 is substantially identical to that described in example 1. Therefore, the detailed description thereof is omitted. On the other hand, the configuration and structure of the head mounted display in example 8 need only be the same as those described in examples 1 to 7. Therefore, the detailed description thereof is omitted.

Example 9

Example 9 is a modification of the image display device in example 8. In example 9, the reference positions are set to the subject imaging positions of the imaging devices 61A and 61B when a subject provided at a predetermined position forward of the two optical devices 120, 320 or 520 is imaged by the imaging devices 61A and 61B. More specifically, a crosshair graphic as illustrated, for example, on the left of FIG. 9C is provided, for example, 4 m forward of the two optical devices 120, 320 or 520 as a subject. On the other hand, the predetermined image (crosshair graphic) is displayed on the two optical devices 120, 320 or 520. Here, the virtual image distance of the predetermined image is also set, for example, to 4 m. That is, an image signal (input image signal or input image data) serving as a first image signal that allows for a kind of test pattern to be displayed is transmitted to the control device 18 and processed by the control device 18 for image display, thus displaying the predetermined image on the image forming devices. At the same time, the predetermined images displayed on the optical devices 120, 320 or 520 are captured with the associated imaging devices (cameras) 61A and 61B to obtain the subject imaging positions.

Then, the first image signal is controlled that is supplied to the image forming device 111 or 211 making up at least one of the image display devices by the control device 18 or an external computer connected to the control device 18 so that the images obtained by capturing the subject and those displayed on the optical devices 120, 320 or 520 are superimposed one on top of another, that is, so that the subject imaging positions match the image capture positions, thus adjusting the mutual positions of the two images as in example 8. That is, a display position correction signal adapted to eliminate the displacement is found by performing the same tasks and following the same method as described in example 8. Then, this display position correction signal is stored in the control device as a display position control signal.

Although the present invention has been described above based on the preferred embodiments, the present invention is not limited thereto. The configurations and structures of the head mounted display and image display devices are merely illustrative and may be changed as appropriate. For example, a surface relief hologram (refer to US Patent No. 20040062505A1) may be used as a light guide plate. The optical device 320 in example 3 or 4 may include a transmission diffraction grating element. Alternatively, one of the first and second deflection sections may include a reflection diffraction grating element, and the other may include a transmission diffraction grating element. Still alternatively, blazed reflection diffraction grating elements may be used as diffraction grating elements.

The present application contains subject matter related to that disclosed in Japanese Priority Patent Application JP 2010-089494 filed in the Japan Patent Office on Apr. 8, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A display apparatus, including:
   an image forming device; and
   an optical device configured to change a direction of light emitted from the image forming device,
   wherein the image forming device is configured to control an image signal for display by the optical device according to a distance from a viewer to a target such that a convergence angle of the viewer can be adjusted with the distance from the viewer to the target.

2. The display apparatus of claim 1, wherein the image forming device is configured to control a received image signal so as to control a position of an image displayed by the optical device of the image display device and adjust a position of the image.

3. The display apparatus of claim 1, wherein the image forming device is configured to adjust the position of the image by a combination of horizontal and vertical movements and rotation of the image displayed on the optical device of the image display device.

4. The display apparatus of claim 1, wherein the optical device is see-through.

5. The display apparatus of claim 1, wherein the distance from the viewer to the target is provided at least in part via information transmitted to the display apparatus from external equipment.

6. The display apparatus of claim 1, further comprising a distance measurement device adapted to obtain distance information by measuring the distance to the target from the viewer.

7. The display apparatus of claim 1, further comprising a light reception sensor for obtaining environment luminance information, wherein the image forming device is configured to control a luminance of the image signal based at least in part on the environment luminance information.

8. The display apparatus of claim 1, wherein the image forming device is configured to control the image signal to comprise text based at least in part on the distance from the viewer to the target.

9. The display apparatus of claim 1, wherein the image forming device is configured control the image signal so that a position of a virtual image formed by the optical device changes over time.

10. The display apparatus of claim 9, wherein the position of the virtual image is changed to reduce a viewer's eye fatigue.

11. The display apparatus of claim 9, wherein the position of the virtual image is changed according to a predetermined schedule.

12. The display apparatus of claim 9, wherein the position of the virtual image is changed in a horizontal direction.

13. The display apparatus of claim 1, wherein the image forming device comprises a digital micromirror device (DMD).

14. The display apparatus of claim 1, wherein the image forming device comprises a Micro Electro Mechanical Systems (MEMS).

15. The display apparatus of claim 1, wherein the image forming device comprises a laser element.

16. A display apparatus comprising:
   an image display device, configured to:
      receive an indication of a first distance between the display apparatus and a target located outside the display apparatus; and
      control a received image signal based at least in part on the first distance;
   wherein a position of a virtual image formed by the image display device is changed over time.

17. The display apparatus of claim 16, wherein the position of the virtual image is changed according to a predetermined schedule.

18. The display apparatus of claim 16, wherein the position of the virtual image is changed in a horizontal direction.

19. The display apparatus of claim 16, wherein the image display device comprises a digital micromirror device (DMD).

20. The display apparatus of claim 16, wherein the image display device comprises a Micro Electro Mechanical Systems (MEMS).

21. The display apparatus of claim 16, wherein the image display device comprises a laser element.

22. A display apparatus comprising:
   an image display device, configured to:
      receive an indication of a first distance between the display apparatus and a target located outside the display apparatus; and
      control a received image signal based at least in part on the first distance;
   wherein a second distance from a viewer to a virtual image formed by the image display device is changed over time.

23. The display apparatus of claim 22, wherein the distance of the virtual image is changed according to a predetermined schedule.

24. The display apparatus of claim 22, wherein the image display device comprises a digital micromirror device (DMD).

25. The display apparatus of claim 22, wherein the image display device comprises a Micro Electro Mechanical Systems (MEMS).

26. The display apparatus of claim 22, wherein the image display device comprises a laser element.

* * * * *